(12) United States Patent
Moon

(10) Patent No.: US 8,886,213 B2
(45) Date of Patent: Nov. 11, 2014

(54) MOBILE TERMINAL AND CONTROL METHOD THEREOF

(75) Inventor: Doohyun Moon, Seoul (KR)

(73) Assignee: LG Electronics Inc., Seoul (KR)

( * ) Notice: Subject to any disclaimer, the term of this patent is extended or adjusted under 35 U.S.C. 154(b) by 265 days.

(21) Appl. No.: 13/101,911

(22) Filed: May 5, 2011

(65) Prior Publication Data

US 2011/0306387 A1  Dec. 15, 2011

(30) Foreign Application Priority Data

Jun. 14, 2010 (KR) ........................ 10-2010-0055941

(51) Int. Cl.
| | | |
|---|---|---|
| H04W 24/00 | (2009.01) | |
| G06F 3/00 | (2006.01) | |
| G06F 17/30 | (2006.01) | |
| G06F 1/16 | (2006.01) | |
| G06F 3/0488 | (2013.01) | |
| H04M 1/725 | (2006.01) | |
| H04W 88/02 | (2009.01) | |

(52) U.S. Cl.
CPC ........ *G06F 1/1684* (2013.01); *G06F 17/30047* (2013.01); *G06F 17/30064* (2013.01); *H04M 2250/22* (2013.01); *H04M 1/72566* (2013.01); *H04W 88/02* (2013.01); *G06F 3/04886* (2013.01); *H04M 2250/52* (2013.01); *G06F 1/1686* (2013.01); *G06F 17/30044* (2013.01); *G06F 17/30041* (2013.01); *G06F 3/0488* (2013.01)
USPC ........................................ 455/456.1; 715/720

(58) Field of Classification Search
USPC ........................................ 455/456.1; 715/720
See application file for complete search history.

(56) References Cited

U.S. PATENT DOCUMENTS

| | | | | |
|---|---|---|---|---|
| 7,486,201 | B2 * | 2/2009 | Kelly et al. ................... | 340/905 |
| 2004/0267440 | A1 * | 12/2004 | DeKock et al. ............... | 701/117 |
| 2008/0098316 | A1 * | 4/2008 | Declan .......................... | 715/764 |
| 2010/0182437 | A1 * | 7/2010 | Shin et al. .................. | 348/207.1 |
| 2011/0060993 | A1 * | 3/2011 | Cotter et al. .................. | 715/720 |

* cited by examiner

*Primary Examiner* — Vladimir Magloire
*Assistant Examiner* — Natasha Cosme
(74) *Attorney, Agent, or Firm* — Lee, Hong, Degerman, Kang & Waimey

(57) ABSTRACT

A method includes displaying an image on a display of a mobile terminal, wherein the image depicts an object; displaying information simultaneously with the image, wherein the information relates to the object at a particular time point of any of a plurality of different time points of a timeline; and changing the displayed information to reflect a change in the particular time point to another time point of the plurality of different time points of the timeline, wherein the changed displayed information is displayed simultaneously with the image and relates to the object at the another time point.

17 Claims, 24 Drawing Sheets

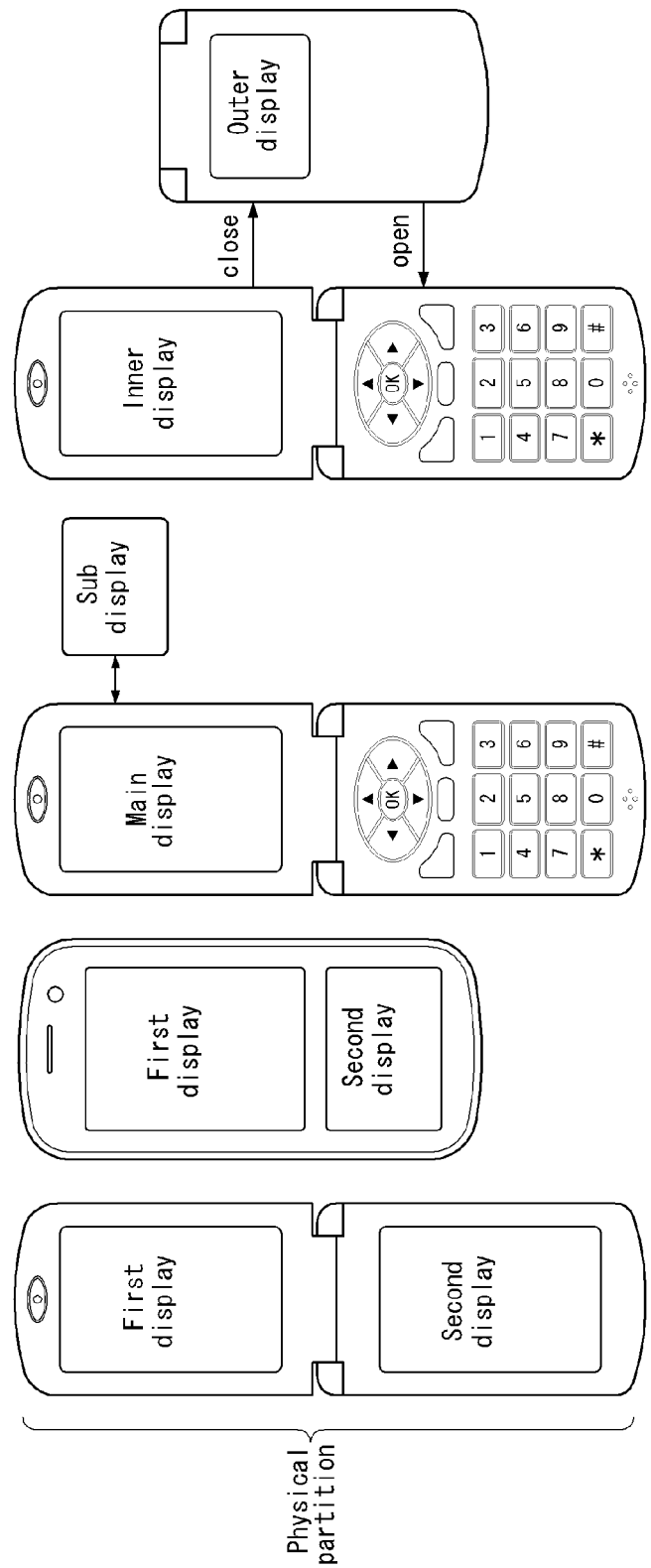

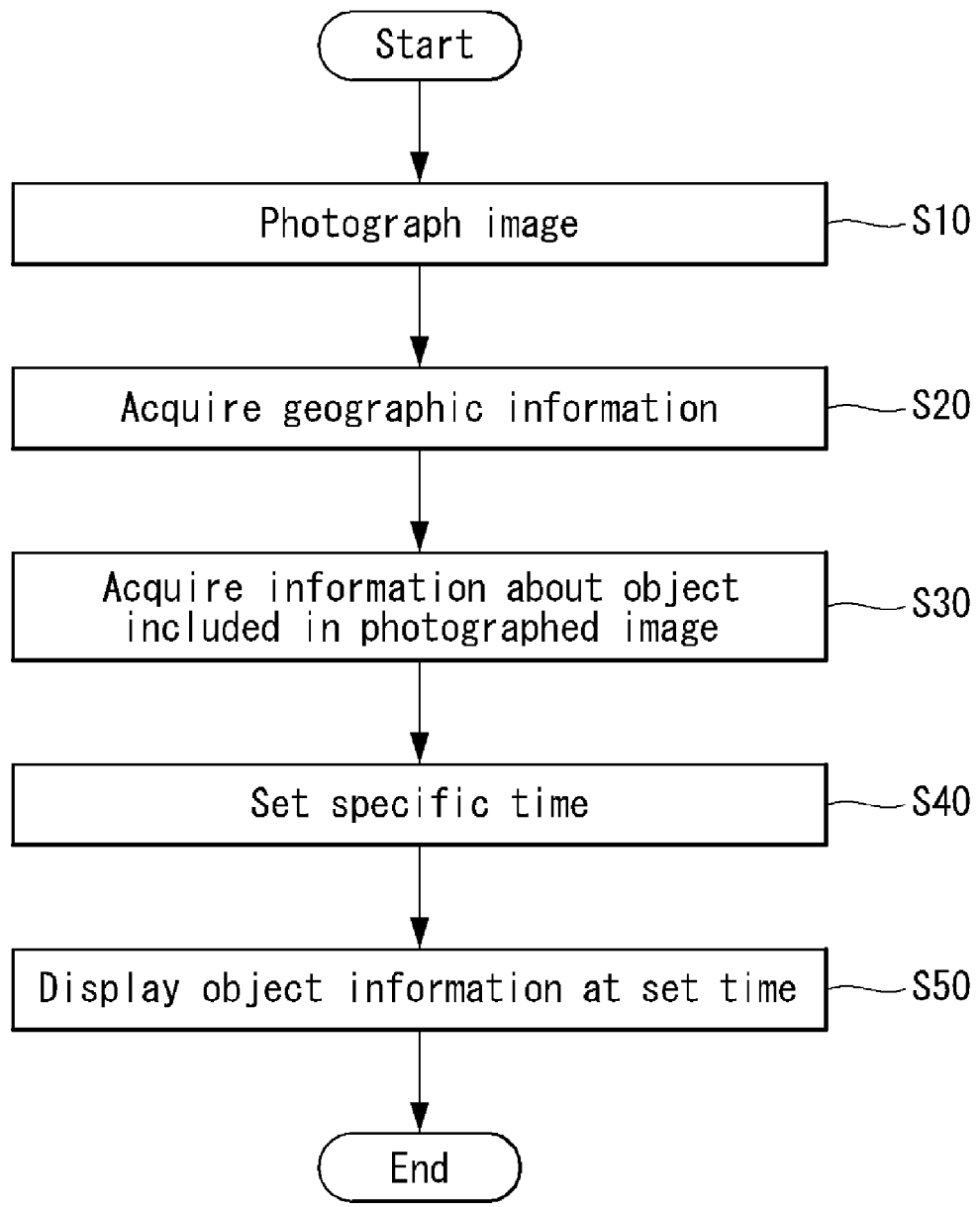

MOBILE TERMINAL AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2010-0055941, filed on Jun. 14, 2010, the contents of which is hereby incorporated by reference herein in its entirety.

FIELD OF THE INVENTION

The present disclosure relates to a mobile terminal, and more particularly, to a mobile terminal and a control method of displaying information.

DISCUSSION OF THE RELATED ART

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

SUMMARY

In a first embodiment of the present invention, a method includes displaying an image on a display of a mobile terminal, wherein the image depicts an object; displaying information simultaneously with the image, wherein the information relates to the object at a particular time point of any of a plurality of different time points of a timeline; and changing the displayed information to reflect a change in the particular time point to another time point of the plurality of different time points of the timeline, wherein the changed displayed information is displayed simultaneously with the image and relates to the object at the another time point.

In a second embodiment of the present invention, a method of controlling information in a mobile terminal includes displaying an image on a display of a mobile terminal, wherein the image depicts an object; displaying information simultaneously with the image, wherein the information relates to the object at a particular time point of any of a plurality of different time points of a timeline; and changing the depicted object to a different version to reflect a change in the particular time point to another time point of the plurality of different time points of the timeline, wherein the different version of the depicted object generally corresponds to a state of the object at the another time point, and wherein the changed depicted object is displayed simultaneously with the information.

In a third embodiment of the present invention, a method of controlling information in a mobile terminal includes displaying an image on a display of a mobile terminal, wherein the image depicts an object; displaying information simultaneously with the image, wherein the information relates to the object at a particular time point of any of a plurality of different time points of a timeline; changing the displayed information to reflect a change in the particular time point to another time point of the plurality of different time points of the timeline; and changing the depicted object to reflect the object at the another time point, wherein the changed displayed information is displayed simultaneously with the changed depicted object.

In a fourth embodiment of the present invention, a mobile terminal includes a display; and a controller configured to display an image on the display, wherein the image depicts an object; display information simultaneously with the image, wherein the information relates to the object at a particular time point of any of a plurality of different time points of a timeline; and change the displayed information to reflect a change in the particular time point to another time point of the plurality of different time points of the timeline, wherein the changed displayed information is displayed simultaneously with the image and relates to the object at the another time point.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIGS. 3C and 3D illustrate versions of the mobile terminal 100 according to an embodiment of the present invention.

FIG. 5 is a flowchart showing an operation of the mobile terminal according to an embodiment of the present invention.

DETAILED DESCRIPTION

Figure 1:
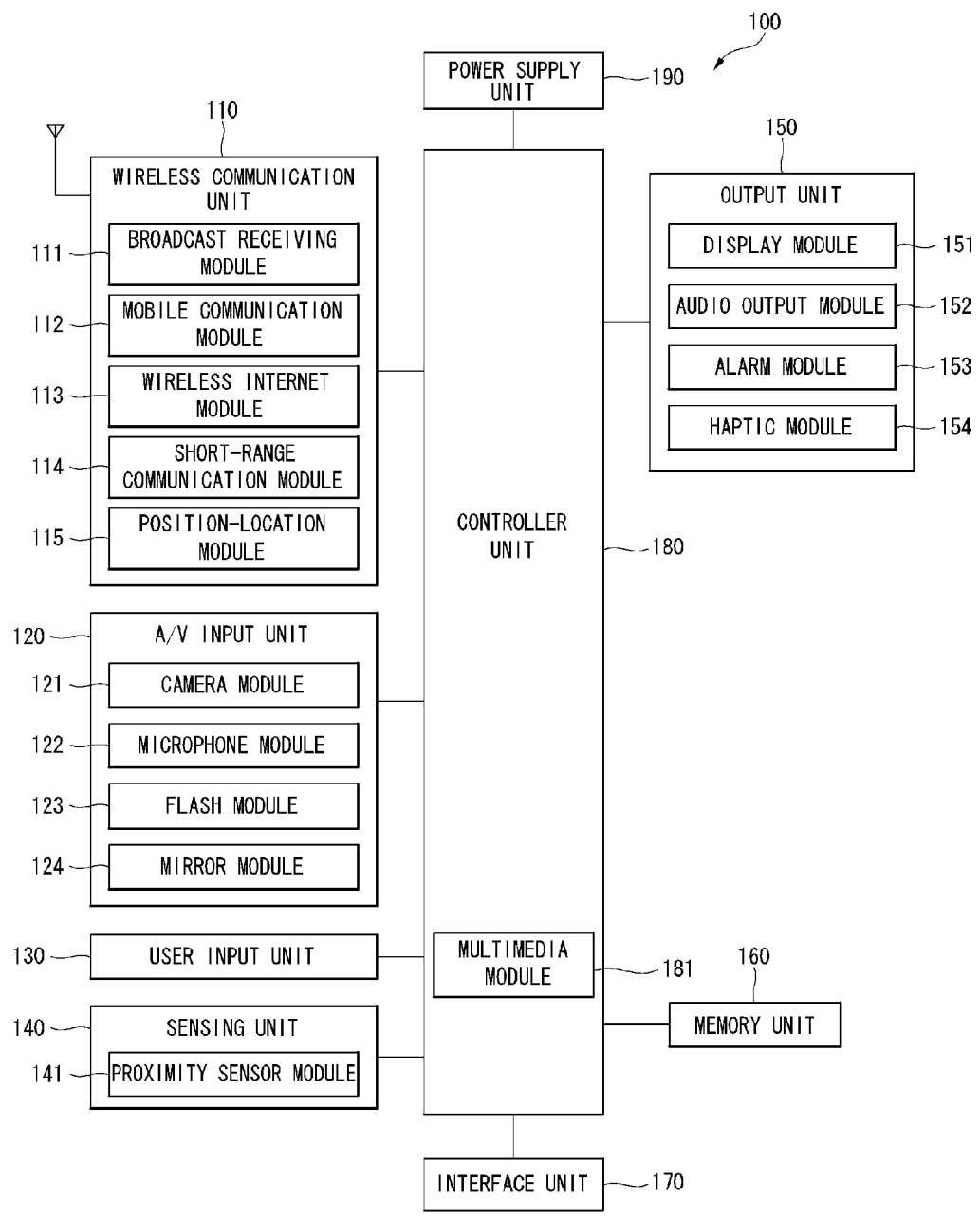
FIG. 1 is a block diagram of a mobile terminal according to an embodiment of the present invention.

The above and other aspects, features and advantages of the present disclosure will be more apparent from the following detailed description taken in conjunction with the accompanying drawings. Hereinafter, an implementation of this document will be described in detail with reference to the attached drawings. Like reference numerals refer to like elements throughout the specification. In describing the present disclosure, detailed descriptions of well-known functions or configurations will be omitted in order to not necessarily obscure the subject matter of the present disclosure.

The suffixes 'module', 'unit' and 'part' may be used for elements in order to facilitate the disclosure herein. Significant meanings or roles may not be given to the suffixes themselves and it is understood that the 'module', 'unit' and 'part' may be used together or interchangeably.

Referring to FIG. 1, the mobile terminal 100 may refer to an electronic device among a plurality of external electronic devices on a network according to an embodiment of the present invention, which will be described in more detail with reference to the drawings. The mobile terminal 100 can include at least a cellular phone, a smart phone, a laptop computer, a digital broadcasting terminal, personal digital assistants (PDA), a portable multimedia player (PMP), or a navigation system.

The mobile terminal 100 according to an embodiment of the present invention includes a wireless communication unit 110, an A/V (audio/video) input unit 120, a user input unit 130, a sensing unit 140, an output unit 150, a memory unit 160, an interface unit 170, a controller unit 180, and a power supply unit 190. FIG. 1 shows the mobile terminal 100 having various components, but it is understood that implementing all of the illustrated components is not required. Greater or fewer components may alternatively be implemented.

The wireless communication unit 110 can include one or more components that permit wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server (not shown) via a broadcast channel. The broadcast channel may include a satellite channel and a terrestrial channel.

The broadcast managing server generally refers to a server which generates and transmits the generated broadcast signal and/or broadcast associated information or a server which is provided with a previously generated broadcast signal and/or broadcast associated information and then transmits the provided broadcast signal or information to the mobile terminal 100. The transmitted broadcast signal may be implemented as a television (TV) broadcast signal, a radio broadcast signal, and a data broadcast signal. The transmitted broadcast signal may be combined with a TV or radio broadcast signal.

The broadcast associated information can include information associated with a broadcast channel, a broadcast program, and a broadcast service provider. The broadcast associated information can be provided via a mobile communication network, and be received by the mobile communication module 112 via a broadcast signal antenna 116.

The broadcast associated information can be implemented in various forms. For example, broadcast associated information may include an electronic program guide (EPG) related to digital multimedia broadcasting (DMB) and electronic service guide (ESG) related to digital video broadcast-handheld (DVB-H).

The broadcast receiving module 111 may be configured to receive broadcast signals transmitted from various types of broadcasting systems. The broadcasting systems can include digital multimedia broadcasting-terrestrial (DMB-T), digital multimedia broadcasting-satellite (DMB-S), digital video broadcast-handheld (DVB-H), media forward link only (MediaFLO®) and integrated services digital broadcast-terrestrial (ISDB-T). Greater or fewer broadcasting systems can be received by the broadcast receiving module 111.

The broadcast signal and/or broadcast associated information received by the broadcast receiving module 111 may be stored in a storage device, such as the memory unit 160.

The mobile communication module 112 transmits and receives wireless signals between one or more network entities (e.g., base station, external terminal, and server) via the broadcast signal antenna 116. The transmitted and received wireless signals may represent audio, video, and data signals according to text or multimedia message transmissions.

The wireless Internet module 113 supports Internet access for the mobile terminal 100. The wireless Internet module 113 may be internally or externally coupled to the mobile terminal 100. In this case, the wireless Internet technology supported by the wireless Internet module 113 can include Wireless LAN (WLAN), Wireless Fidelity (Wi-Fi™), Wibro (Wireless broadband), World Interoperability for Microwave Access (WiMAX), and High Speed Downlink Packet Access (HSDPA).

The short-range communication module 114 facilitates relatively short-range communications. Suitable technologies for implementing the short-range communication module 114 can include radio frequency identification (RFID), infrared data association (IrDA), ultra-wideband (UWB), Bluetooth® and ZigBee®.

The position information module 115 is a module for identifying or otherwise obtaining a position of the mobile terminal. The position information module 115 can acquire position information using a global navigation satellite system (GNSS). Here, GNSS refers to radio navigation satellite systems that orbit the earth and transmit reference signals so that the location of certain types of radio navigation receivers on the earth's surface can be determined or approximated. GNSS includes a global positioning system (GPS) managed by the USA, Galileo managed by Europe, global orbiting navigational satellite system (GLONASS) managed by Russia, COMPASS managed by China, and quasi-zenith satellite system (QZSS) managed by Japan.

As one representative example of GNSS, the position information module 115 may be a GPS (Global Positioning System) module. The GPS module 115 can calculate information on distances between one point (object) and at least three satellites, information on the time when the distance information is measured, and use the obtained distance information to triangulate three-dimensional position information on the point (object) according to latitude, longitude and altitude at a predetermined time. Moreover, a method of calculating position and time information using three satellites and correcting the calculated position and time information using another satellite can also be used. In addition, the GPS module 115 continuously calculates the current position in real time and calculates velocity information using the position information.

The audio/video (A/V) input unit 120 can be configured to provide audio or video signal input to the mobile terminal 100. The A/V input unit 120 can include a camera module 121, a microphone module 122, a flash module 123 and a mirror module 124. The camera module 121 can receive and process image frames of still pictures (e.g., photographs) obtained by an image sensor when the mobile terminal 100 is in a photographing mode, and alternatively, receive and process moving picture data (e.g., video) when the mobile terminal 100 is in a video call mode. The processed image frames can be displayed by the output unit 150, such as a display module 151.

The image frames processed by the camera module 121 can be stored in the memory unit 160 or can be externally transmitted via the wireless communication unit 110. At least two camera modules 121 can be provided in the mobile terminal 100 depending on the usage environment.

The microphone module 122 receives an external audio signal while the mobile terminal 100 is in a particular mode, such as a phone call mode, a recording mode and a voice recognition mode. The external audio signal is processed and converted into digital audio data. The digital audio data is transformed into a format transmittable to a mobile communication base station via the mobile communication module 112 when the mobile terminal 100 is in a call mode. The microphone module 122 can include assorted noise removing algorithms to remove noise generated when receiving the external audio signal. The flash module 123 can provide lighting in conjunction with the camera module 121 obtaining images of the external environment. The mirror module 124 can provide a user with a reflective surface.

The user input unit 130 generates input data responsive to user manipulation of one or more associated input devices. Examples of such input devices can include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal 100. For example, the sensing unit 140 may detect an open/close status of the mobile terminal 100, a relative positioning of components (e.g., a display and keypad) of the mobile terminal 100, a change of position of the mobile terminal 100 or a component of the mobile terminal 100, a presence or absence of user contact with the mobile terminal 100, or an orientation or acceleration/deceleration of the mobile terminal 100.

In another example, when the mobile terminal 100 is configured as a slide-type mobile terminal, the sensing unit 140 may sense whether a sliding portion of the mobile terminal 100 is open or closed. In another example, the sensing unit 140 can sense the presence or absence of power provided by the power supply unit 190, the presence or absence of a coupling or connection between the interface unit 170 and a device external to the mobile terminal 100. The sensing unit 140 can include a proximity sensor 141.

The output unit 150 generates outputs relevant to senses of sight, hearing, and touch. The output unit 150 can include the display module 151, an audio output module 152, an alarm module 153, a haptic module 154 and an earphone module 156.

The display module 151 can be implemented to visually display or output information associated with the mobile terminal 100. For example, if the mobile terminal 100 is operating in a phone call mode, the display module 151 can provide a user interface (UI) or graphical user interface (GUI) which includes information associated with placing, conducting, and terminating a phone call. In another example, if the mobile terminal 100 is in a video call mode or a photographing mode, the display module 151 may additionally or alternatively display images which are associated with the photographing or video call modes, the UI or the GUI.

The display module 151 may be implemented using one or more display technologies which include a liquid crystal display (LCD), a thin film transistor-liquid crystal display (TFT-LCD), an organic light-emitting diode display (OLED), a flexible display and a three-dimensional (3D) display. Moreover, a transparent display can be implemented using some of the foregoing display technologies in a transparent or optical transmittive type, such as a transparent OLED (TOLED).

A rear configuration of the display module 151 can be implemented in the optical transmittive type as well. In this configuration, a user can see an object at a rear portion of the mobile terminal 100 via an area occupied by the display module 151.

At least two display modules 151 can be provided in the mobile terminal 100. For example, a plurality of display modules 151 can be arranged on a single face of the mobile terminal 100 spaced apart from each other or built into one body. Alternatively, a plurality of display modules 151 can be arranged on different faces of the mobile terminal 100.

If the display module 151 and the sensing unit 140 for detecting a touch action (hereinafter called "touch sensor") are configured as a mutual layer structure (hereinafter called "touchscreen"), the display module 151 can be used as a user input unit 130 as well as an output unit 150. The touch sensor can be configured as a touch film, a touch sheet, or a touchpad.

The touch sensor can be configured to convert a pressure applied to a specific portion of the display module 151 or a variation of a capacitance generated from a specific portion of the display module 151 to an electric input signal. Accordingly, the touch sensor detects a pressure of a touch as well as a touched position or size.

If a touch input is made to the touch sensor, signal(s) corresponding to the touch input is transferred to a touch controller (not shown). The touch controller processes the signal(s) and then transfers the processed signal(s) to the controller unit 180. Therefore, the controller unit 180 can determine whether a prescribed portion of the display module 151 has been touched.

The proximity sensor 141 can be provided to an internal area of the mobile terminal 100 enclosed by the display module 151, such as the touchscreen or around the touchscreen. The proximity sensor 141 is a sensor that detects a presence of an object approaching a prescribed detecting surface or an object existing around the proximity sensor 141 using an electromagnetic field strength or infrared ray without mechanical contact. The proximity sensor 141 can be more durable and more useful than a contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, or an infrared proximity sensor. If the touchscreen includes the electrostatic capacity proximity sensor, the touchscreen is configured to detect the proximity of a pointer according to a variation in an electric field formed by the proximity of the pointer to the touchscreen. Accordingly, the touchscreen or touch sensor can be classified as the proximity sensor 141.

An action when a pointer approaches without contacting the touchscreen so the pointer is recognized as being located on the touchscreen is defined as "proximity touch." An action when a pointer actually touches the touchscreen is defined as "contact touch." The meaning of the position on the touchscreen proximity-touched by the pointer means the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, or a proximity touch shift state.). Information corresponding to the detected proximity touch action and the detected proximity touch pattern can be displayed on the touchscreen.

Figure 2:
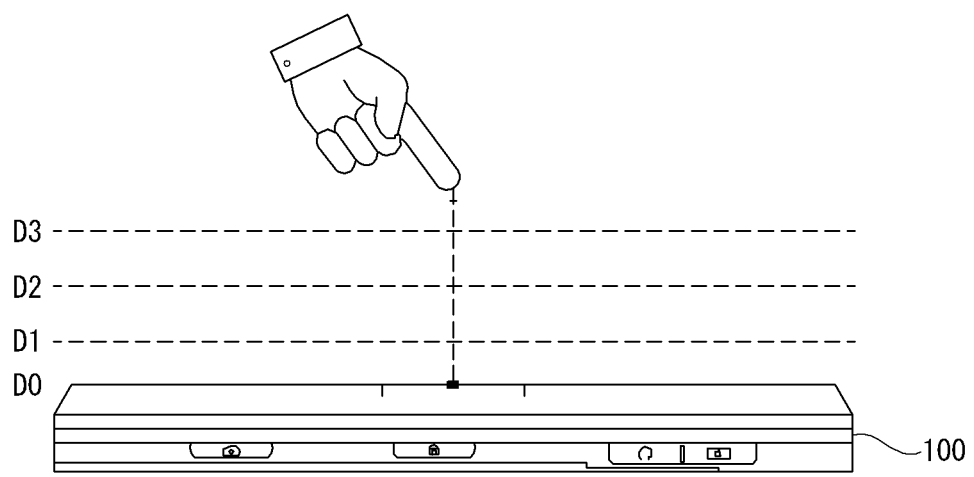
FIG. 2 is a conceptual diagram for explaining a proximity depth of a proximity sensor according to an embodiment of the present invention.

FIG. 2 is a conceptual diagram for explaining a proximity depth of a proximity sensor according to an embodiment of the present invention. When a pointer, such as a user's finger or a pen approaches the display module 151, the proximity sensor 141 provided within or in the vicinity of the display module 151 detects the approach of the pointer and then outputs a proximity signal. The proximity sensor 141 can be configured to output a different proximity signal according to a distance between the pointer and the proximity-touched display module 151 (hereinafter "proximity depth").

Referring to FIG. 2, a cross-section of the mobile terminal 100 is provided with a proximity sensor 141 capable of sensing three proximity depths, for example. It can be understood that the proximity sensor 141 can be capable of sensing proximity depths amounting to a number smaller than 3 and equal to or greater than 4.

For example, when the pointer is fully contacted with the display module 151 at d0, the relation is recognized as a contact touch. When the pointer is spaced apart from the display module 151 at a distance d1, the relation is recognized as a proximity touch at a first proximity depth. When the pointer is spaced apart from the display module 151 at a distance between d1 and d2, the relation is recognized as a proximity touch at a second proximity depth. When the pointer is spaced apart from the display module 151 at a distance between d2 and d3, the relation is recognized as a proximity touch at a third proximity depth. Further, when the pointer is spaced apart from the display module 151 at a distance equal to or greater than d3, no proximity touch is recognized.

Hence, the controller unit 180 can recognize the proximity touch as one of various input signals according to the proximity depth and position of the pointer relative to the display module 151. In some examples, the controller unit 180 can perform various operation controls according to the various input signals.

Referring to FIG. 1, the audio output module 152 functions in various modes including a call-receiving mode, a call-placing mode, a recording mode, a voice recognition mode, and a broadcast reception mode in order to output audio data which is received from the wireless communication unit 110 or stored in the memory unit 160. During operation, the audio output module 152 outputs audio relating to a particular function (e.g., call received, message received). The audio output module 152 can be implemented individually or by using one or more speakers, buzzers, and other audio producing devices.

The alarm module 153 outputs a signal for announcing an occurrence of a particular event associated with the mobile terminal 100. Examples of the announced events can include a call received event, a message received event and a touch input received event.

The alarm module 153 can output a signal for announcing the event occurrence by way of vibration as well as via a video or audio signal. The video or audio signal can be output via the display module 151 or the audio output module 152. Hence, the display module 151 or the audio output module 152 can be regarded as a part of the alarm module 153.

The haptic module 154 generates various tactile effects that can be sensed by a user. Vibration is a representative tactile effect generated by the haptic module 154. Strength and pattern of the vibration generated by the haptic module 154 can be controlled. For example, different vibrations can be output simultaneously or sequentially.

The haptic module 154 can generate various tactile effects as well as the vibration. For example, the haptic module 154 generates an effect attributed to the arrangement of pins vertically moving against a contact skin surface, an effect attributed to the injection/suction power of air though an injection/suction hole, an effect attributed to skimming over a skin surface, an effect attributed to the contact with an electrode, an effect attributed to electrostatic force, or an effect attributed to the representation of hold/cold sense using an endothermic or exothermic device.

The haptic module 154 can be implemented to enable a user to sense the tactile effect through a muscle sense of a finger or an arm as well as to transfer the tactile effect through direct contact. At least two haptic modules 154 can be provided in the mobile terminal 100.

Furthermore, the audio output module 152 can output sound through an earphone jack 156. The user can connect earphones to the earphone jack 156 and hear the output sound.

The memory unit 160 can be used to store various types of data to support processing, control, and storage requirements of the mobile terminal 100. Examples of such stored data include program instructions for applications operating on the mobile terminal 100, contact data, phonebook data, messages, audio, still pictures, and moving pictures. The memory unit 160 can also store a recent use history or a cumulative use frequency of each data (e.g., use frequency for each phonebook, each message or each multimedia). Moreover, data for various patterns of vibration and/or sound output can be stored in the memory unit 160 when a touch input to the touchscreen is sensed.

The memory unit 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory), or other similar memory or data storage device. Further, the mobile terminal 100 can operate via a web storage entity for performing a storage function of the memory unit 160 on the Internet.

The interface unit 170 can be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and an earphone port.

The identity module (not shown) can be an integrated circuit for storing various types of information for authenticating a use authority of the mobile terminal 100 and can include a User Identify Module (UIM), Subscriber Identify Module (SIM), and Universal Subscriber Identity Module (USIM). A device having the identity module (hereinafter called "identity device") can be manufactured as a smart card. Therefore, the identity device can be connected to the mobile terminal 100 via a corresponding port.

When the mobile terminal 100 is connected to an external cradle, the interface unit 170 provides a passage for supplying power to the mobile terminal 100 from the external cradle or a passage for delivering various command signals input by a user via the external cradle, to the mobile terminal 100. Each of the delivered command signals input via the external cradle or the supplied power can signal that the mobile terminal 100 has been correctly loaded in the external cradle.

The controller unit 180 controls the overall operations of the mobile terminal 100. For example, the controller unit 180 controls and processes voice calls, data communications, and video calls.

The controller unit 180 may include a multimedia module 181 that provides multimedia playback. The multimedia module 181 may be configured as part of the controller unit 180, or implemented as a separate component. Moreover, the controller unit 180 can perform a pattern recognition process for recognizing characters of a written input and images of a picture drawing input carried out on the touchscreen.

The power supply unit 190 provides power required by the various components of the mobile terminal 100. The provided power may be provided internally or externally to the mobile terminal 100.

Various embodiments described herein may be implemented in a computer-readable medium using, for example, computer software, hardware, or some combination thereof. For a hardware implementation, the embodiments described herein may be implemented individually or combined within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein. The foregoing embodiments may also be implemented by the controller unit 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory unit 160, and executed by a controller or processor, such as the controller unit 180.

Figure 3A:
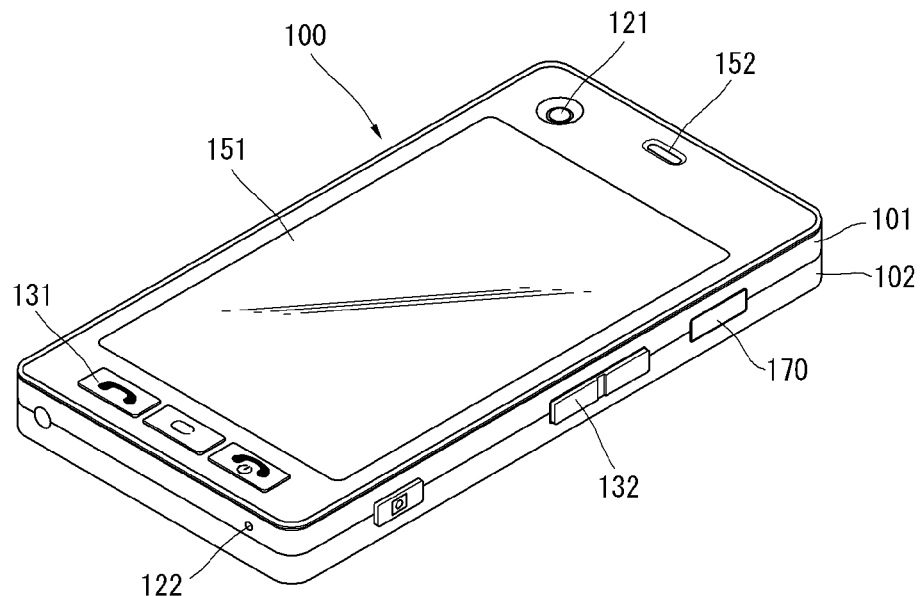
FIG. 3A is a front perspective view of the mobile terminal according to an embodiment of the present invention.

FIG. 3A is a perspective diagram of a front side of a mobile terminal 100 according to an embodiment of the present invention. The mobile terminal 100 is configured to have a bar-type terminal body. Yet, the mobile terminal 100 may be implemented in a variety of different configurations. Examples of such configurations include a folder-type, a slide-type, a rotational-type, a swing-type and combinations thereof. For clarity, the remainder of the disclosure will discuss the mobile terminal 100 directed to the bar-type terminal body. However such teachings apply equally to other types of mobile terminals.

Referring to FIG. 3A, the mobile terminal 100 includes a case (casing, housing, cover, etc.) configuring an exterior thereof. In the present embodiment, the case can be divided into a front case 101 and a rear case 102. Various electric or electronic parts are loaded in a space provided between the front case 101 and rear case 102. Optionally, at least one middle case can be additionally provided between the front case 101 and rear case 102.

The cases 101 and 102 can be formed by injection molding of synthetic resin or can be formed of metal substances such as stainless steel or titanium.

The front case 101 of the mobile terminal 100 can include the display module 151, the audio output unit 152, a camera module 121, user input units 131 and 132, the microphone module 122, or the interface unit 170.

The display module 151 occupies most of a main face of the front case 101. The audio output unit 151 and the camera module 121 are provided on an area adjacent to one of two end portions of the display module 151, while the user input unit 131 and the microphone module 122 are provided to another area adjacent to the other end portion of the display module 151. The user input unit 132 and the interface unit 170 can be provided on lateral sides of the front case 101 and rear case 102.

The input unit 130 is manipulated to receive a command for controlling an operation of the mobile terminal 100. The input unit 130 is able to include a plurality of manipulating units 131 and 132. The manipulating units 131 and 132 can be named a manipulating portion and may adopt any mechanism of a tactile manner that enables a user to perform a manipulation action by sensing a tactile feedback.

Content input by the first manipulating unit 131 or second manipulating unit 132 can be diversely set. For instance, commands such as start, end or scroll can be input to the first manipulating unit 131. On the other hand, commands directed to adjusting a volume of sound outputting from the audio output unit 152 or switching to a touch recognizing mode of the display module 151 can be input to the second manipulating unit 132.

Figure 3B:
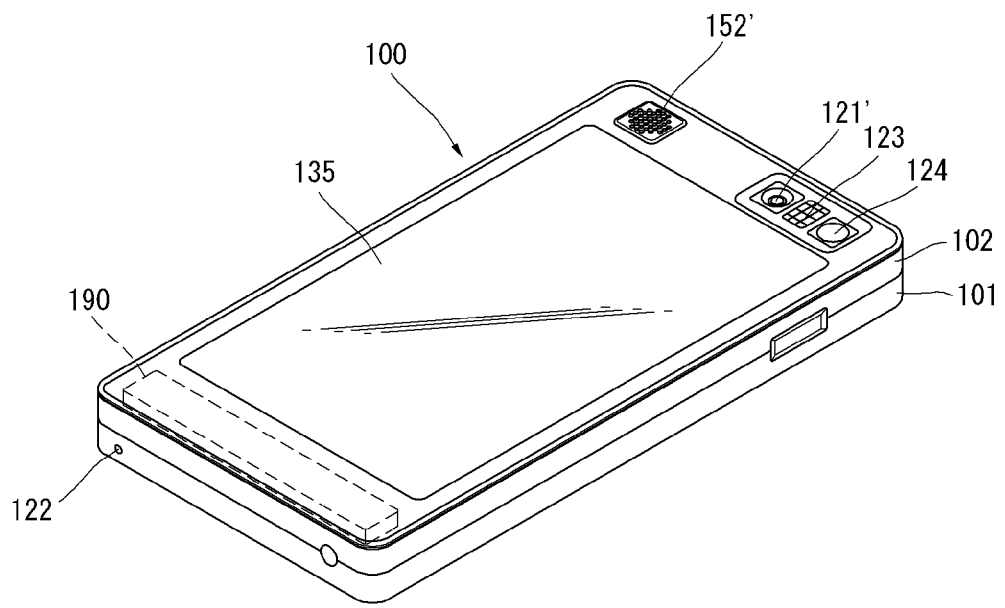
FIG. 3B is a rear perspective view of the mobile terminal according to an embodiment of the present invention.
Figure 4:
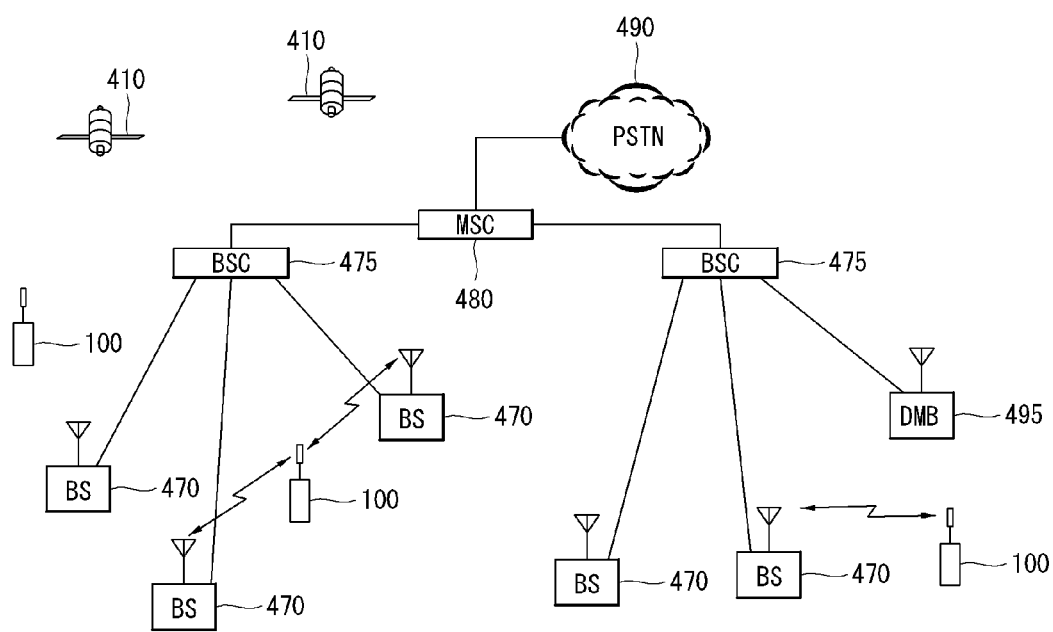
FIG. 4 is a conceptual view illustrating a configuration of a CDMA wireless communication system communicating with the mobile terminal according to an embodiment of the present invention.

FIG. 3B is a perspective diagram of a rear side of the mobile terminal 100 shown in FIG. 4 according to an embodiment of the present invention. Referring to FIG. 3B, a camera module 121' can be additionally provided to a backside of the mobile terminal 100, and more particularly, to the rear case 102. The camera module 121' has a photographing direction that is substantially opposite to that of the camera module 121 shown in FIG. 3A and may have a different number of pixels to provide a different resolution from that of the camera module 121.

Preferably the camera module 121 can have enough resolution to capture and transmit a picture of a user's face for a video call, while the camera module 121' has a higher resolution for capturing a general subject for photography without transmitting the captured subject. Each of the camera modules 121 and 121' can be installed in the mobile terminal 100 to be rotated open or popped open.

The flash module 123 and the mirror module 124 are additionally provided adjacent to the camera module 121'. The flash module 123 projects light toward a subject in case of photographing the subject using the camera module 121'. In case that a user attempts to take a picture of the user (e.g., self-photography) using the camera module 121', the mirror module 124 enables the user to view user's face reflected by the mirror module 124.

An additional audio output unit 152' can be provided to the backside of the mobile terminal 100. The additional audio output unit 152' is able to implement a stereo function together with the audio output unit 152 shown in FIG. 3A and may be used to implement a speakerphone mode when the mobile terminal 100 is configured in the phone call mode.

The broadcast signal antenna 116 can be provided to the lateral side of the mobile terminal 100 to provide further communication capabilities to the mobile terminal 100. The broadcast signal antenna 116 can be constructed as a portion of the broadcast receiving module 111 shown in FIG. 1. Additionally, the broadcast signal antenna 116 can be configured to be retractable in the mobile terminal 100.

The power supply unit 190 for supplying power to the mobile terminal 100 can be configured to be built within the mobile terminal 100. Alternatively, the power supply unit 190 can be configured to be detachably connected to the mobile terminal 100.

A touchpad 135 for detecting a touch can be additionally provided to the rear case 102. The touchpad 135 can be configured in a light transmittive type like the display module 151. In this case, if the display module 151 is configured to output visual information from its both faces, it is able to recognize the visual information via the touchpad 135 as well. The information output from both of the faces can be entirely controlled by the touchpad 135. Alternatively, a display is further provided to the touchpad 135 so that a touchscreen can be provided to the rear case 102 as well.

The touchpad 135 is activated by interconnecting with the display module 151 of the front case 101. The touchpad 135 can be provided in rear of the display module 151 in parallel. The touchpad 135 can have a size equal to or smaller than that of the display module 151.

Figure 3D:
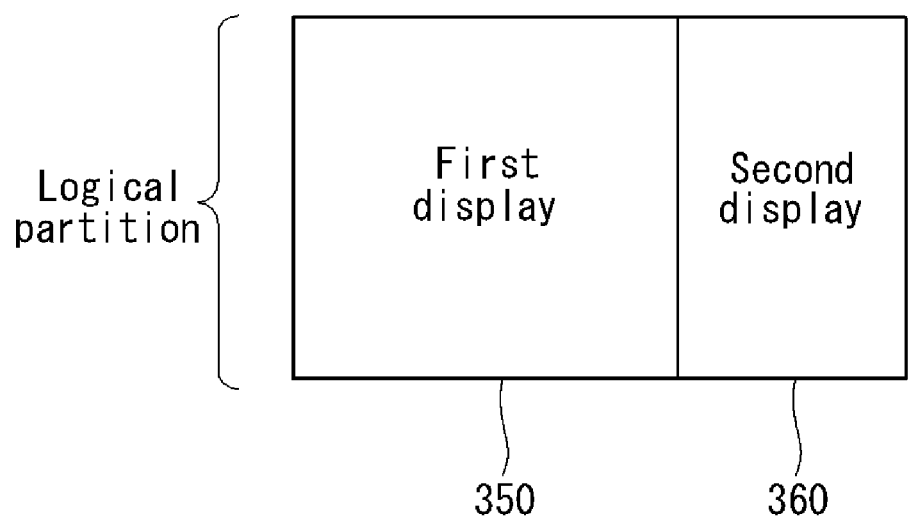

FIGS. 3C and 3D illustrate versions of the mobile terminal 100 according to an embodiment of the present invention. Referring to FIG. 3C, the display module 151 can include a first display and a second display which are physically separated from each other. In a folder type or slide type mobile terminal having two bodies connected through a hinge or slide, the first display (or main display) can be formed on the inner face or outer face of one of the bodies and the second display (or sub display) can be formed on the inner face or outer face of the other body. The sub display is separated from the mobile terminal and detachably combined with the mobile terminal body through an interface to display data from the mobile terminal 100. Referring to FIG. 3D, the display module 151 can include a first display 350 and second display 360 which are logically partitioned from each other.

Referring to FIG. 4, a CDMA wireless communication system 400 includes mobile terminals 100, base stations 470, base station controllers 475, and a mobile switching center 480. The mobile switching center 480 is connected to a public switch telephone network (PSTN) 490. The mobile switching center 480 is connected to the base station controllers 475. The base station controllers 475 are connected to the base stations 470 through backhaul lines. The backhaul lines may be constructed according to at least E1/T1, ATM, IP, PPP, frame relay, HDSL, ADSL or xDSL. The CDMA wireless communication system 400 may include at least two base station controllers 475.

Each base station 470 may include one or more sectors and each sector may include an omnidirectional antenna or an antenna adjusted to a specific radiation direction from the base station 470. Alternatively, each sector may include two diversity reception antennas. Each base station 470 is constructed to have frequency assignments, and the frequency assignments may have specific spectra (e.g., 1.25 MHz and 5 MHz). Furthermore, an intersection of sectors and frequency assignments may be referred to as a CDMA channel.

The base stations 470 may be referred to as base station transceiver subsystems (BTSs). A "Base station" may be used as a term that collectively designates the base station controller 475 and one or more base stations 470 in several examples. Furthermore, the base stations 470 may be referred to as "cell sites." Alternatively, individual sectors of a given base station 470 may be referred to as cell sites.

A terrestrial DMB transmitter 495 can transmit broadcasting signals to the mobile terminals 100 operating in the CDMA wireless communication system 400. The broadcasting receiving module 111 (FIG. 1) of each mobile terminal 100 is constructed to receive the broadcasting signals transmitted from the DMB transmitter 495. This can be similarly applied to different types of broadcast and multicast signaling as described above.

The CDMA wireless communication system 400 may communicate with global positioning system (GPS) satellites 410. The GPS satellites 410 can track the positions of some or all of the mobile terminals 100 in the system. Although two satellites are shown in FIG. 4, position information can be obtained from less than or more than two satellites. In addition, other position-tracking techniques, such as position-tracking techniques that can substitute for GPS technique or can be added to the GPS technique, can be used. If required, some or all of the GPS satellites 410 can support satellite DMB transmission separately or additionally.

When the CDMA wireless communication system 400 operates, the base stations 470 receive reverse link signals from the mobile terminals 100. The mobile terminals 100 may be in a state that the mobile terminals 100 are making calls, sending messages or performing other communications. The reverse link signals received by the base stations 470 are processed by the base stations 470. The processed data is transmitted to the base station controllers 475 connected to the base stations 470. The base station controllers 475 provide call resource allocation and mobility management functionality including soft handoffs between the base stations 470. Furthermore, the base station controllers 475 transmit the received data to the mobile switching center 480. The mobile switching center 480 provides additional routing services for interfacing with the PSTN 490. Similarly, the PSTN 490 interfaces with the mobile switching center 480, and the mobile switching center 480 interfaces with the base station controllers 475. The base station controllers 475 control the base stations 470 to transmit forward link signals to the mobile terminals 100.

FIG. 5 is a flowchart showing an operation of the mobile terminal according to an embodiment of the present invention. The controller unit 180 (FIG. 1) of the mobile terminal 100 may control the camera module 121 to photograph an image (S10). The controller unit 180 may acquire geographic information corresponding to the photographed image (S20). The controller unit 180 may acquire information about an object included in the photographed image (S30). The controller unit 180 may set a specific time in relation to the photographed image (S40). Finally, when the specific time is set, the controller unit 180 may display the information about the object at the specific time (S50).

Figure 6A:
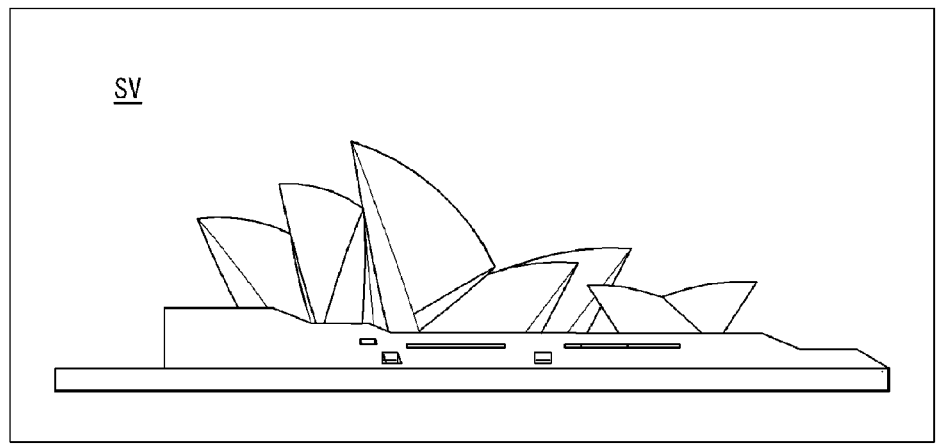
FIGS. 6A and 6B are views describing the operation of the mobile terminal according to an embodiment of the present invention.
Figure 6B:
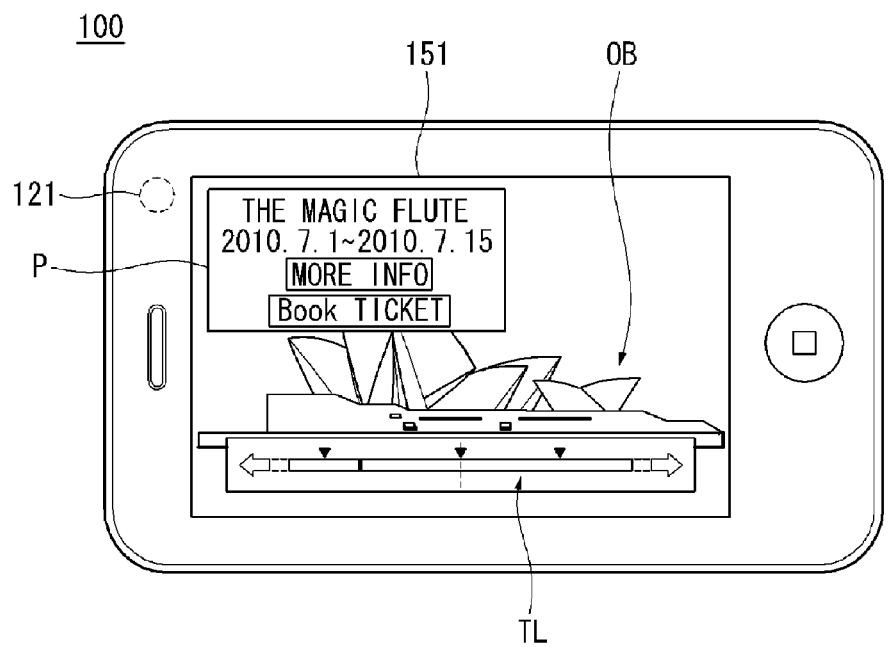

FIGS. 6A and 6B are views describing the operation of the mobile terminal according to an embodiment of the present invention. Referring to FIG. 6A, the camera module 121 may be activated by an operation of the user via the mobile terminal 100 or a control operation of the controller unit 180. The activated camera module 121 can photograph a surrounding video "SV." The surrounding video "SV" may depend on the orientation of the mobile terminal 100. For example, the camera module 121 captures an image or moving image depending on the orientation of the mobile terminal 100 even though the camera module 121 is activated at a specific point.

FIG. 6B illustrates an object "OB" of a theater and information about the object "OB" as the present program of the theater. Additionally, information may be displayed through a pop-up window "P." Referring to FIG. 6B, the controller unit 180 can acquire geographic information corresponding to the photographed image (S20 of FIG. 5). The geographic information may be elementary information used to obtain information about the surrounding picture "SV" captured by the camera module 121. Geographic information about the position and photographing direction of the mobile terminal 100 may be required to acquire information about an object "OB" included in the surrounding video "SV" photographed by the camera module 121. For example, if there is fundamental geographic information representing that the mobile terminal 100 is photographing an image in a direction at an angle of 15° to the north from a point (x, y), the controller unit 180 can recognize the object "OB" located in the direction to acquire the information about the object "OB."

In one embodiment, the geographic information may be obtained through a global navigation satellite system (GNSS), for example. The GNSS acquires geographic information using a method of obtaining signals transmitted from GPS satellites 410 in orbit (FIG. 4). For instance, the position information module 115 of the mobile terminal 100 detects the position of the mobile terminal 100 using a time difference among signals transmitted from the GPS satellites 410. The GNSS is classified into global positioning system (GPS), Galileo, global orbiting navigation satellite system (GLONASS), Indian regional navigation satellite system (IRNSS) and Quasi-Zenith satellite system (QZSS) according to the central operating body.

In another embodiment, the geographic information may be acquired through a geomagnetic sensor included in the mobile terminal 100. The geomagnetic sensor senses terrestrial magnetism penetrating the north and south poles of the earth and functions as a kind of a compass.

In still another embodiment, the geographic information may be acquired through an acceleration sensor module 141 (not shown) included in the sensing unit 140 of the mobile terminal 100. The acceleration sensor can sense a relative position of the mobile terminal 100 based on a specific point (x, y) in a three-dimensional space.

The controller unit 180 may recognize the position of the mobile terminal 100 on the earth and the orientation of the camera 100 in the position from the geographic information acquired using the GNSS, geomagnetic sensor or acceleration sensor.

The object "OB" may be a target from which information is acquired. That is, the object "OB" may be a specific subject that is included in the surrounding video "SV" captured by the camera module 121 and has information in which the user is interested in retrieving. The object "OB" may include material and immaterial objects. The material object may include at least, but not limited to, buildings or roads and the immaterial object may include weather, for example.

Since the geographic information including the orientations of the mobile terminal 100 and the camera module 121 has been acquired, the controller unit 180 can determine the object "OB" captured by the camera module 121. For example, the controller unit 180 knows that the camera module 121 is taking a picture in a direction A from the point (x, y), and thus the controller unit 180 can recognize the object "OB" existing in the direction A.

The controller unit 180 may specify the object "OB" through geographic information and image analysis. In some examples, the surrounding video "SV" captured by the camera module 121 may include various objects in addition to the specific object "OB" in which the user is interested. When the user selects the specific object "OB" from the various objects included in the surrounding video "SV," the controller unit 180 can handle the image of the object "OB" separately from the other objects. The image of the object "OB" may be analyzed by the controller unit 180 or transmitted to an external server (not shown) and analyzed by the external server.

When the specific object "OB" included in the surrounding video "SV" is specified, information about the object "OB" may be acquired The controller unit 180 may acquire information about the specific object included in the photographed image (S30 of FIG. 5). The external server may be requested to provide the information about the object "OB." Alternatively, information previously stored in the memory unit 160 of the mobile terminal 100 may be used as the information about the object "OB."

The information about the object "OB" may vary with time. If the object "OB" is a building, for example, another building might be located at the site of the building corresponding to the object "OB" at a first specific time in the past and the building corresponding to the object "OB" might be under construction at a second specific time in the past. If the object "OB" is a theater, different programs might be performed at the theater at a specific time in the past, in the present or at a specific time in the future. The mobile terminal 100 according to an embodiment of the present invention can extract only information corresponding to a specific time from the information about the object "OB," which may vary with time, and set the specific time according to a user's choice or based on a control signal of the controller unit 180.

The controller unit 180 may set the specific time through a timeline "TL" displayed on the display module 151. The timeline "TL" may represent the past by a left portion thereof and represent the future by a right portion thereof relative to a cursor designated as present time on the timeline "TL." The mobile terminal 100 may display information about the object "OB" at the present time as a default setting. If the user drags or flicks the timeline "TL" to the left for a specific time in the past or to the right for a specific time in the future may be selected based on the direction and intensity of the dragging or flicking operation.

The information about the object "OB" may depend on the selected object "OB." If the selected object "OB" is a building, for example, the information about the object "OB" may include the constructing process of the building or price information. The information about the object "OB" may include the contents of the performance presented at a theater if the object "OB" is a theater, weather if the selected object is sky and stock information if the object "OB" is the logo of a specific publicly traded company. The user or the controller unit 180 may determine the information to be displayed.

Figure 7:
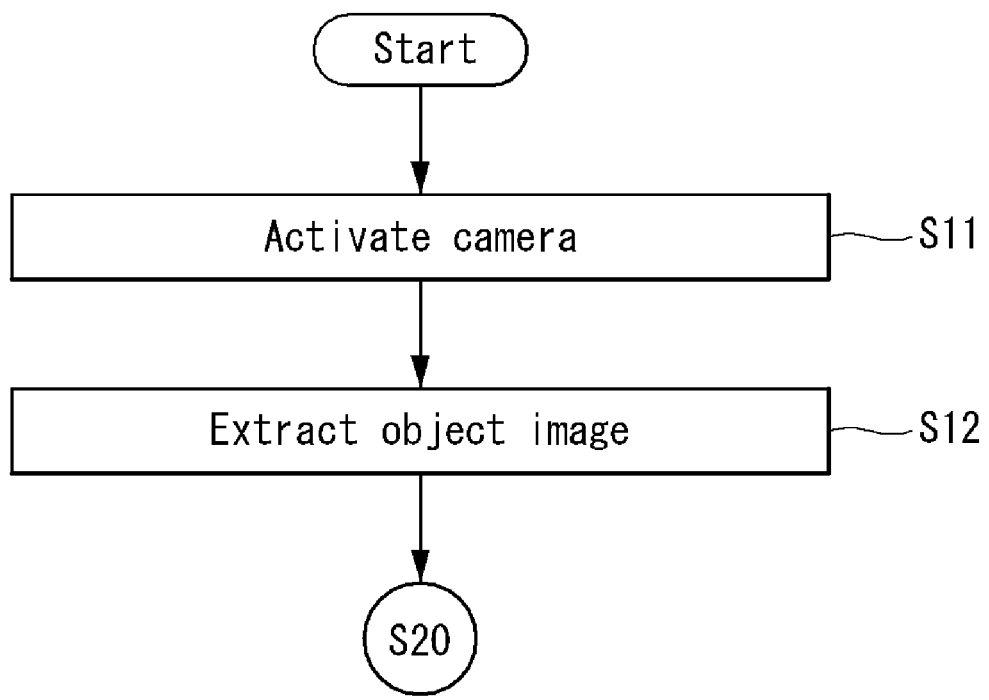
FIG. 7 is a flowchart illustrating an operation of capturing an image according to an embodiment of the present invention.

FIG. 7 is a flowchart illustrating an operation of capturing an image according to an embodiment of the present invention. Referring to FIG. 7, the operation S10 of capturing an image may include activating the camera module 121 (S11).

The camera module 121 may not be activated generally. That is, the camera module 121 may not be configured in a state to photograph images by default. When the camera module 121 is activated and enters a standby state, it may be necessary to supply power to the camera module 121 including charge coupled device (CCD) elements. Accordingly, the controller unit 180 can reduce power supplied from the power supply unit 190 to the camera module 121 such that the camera module 121 transitions to an inactive state. The camera module 121 in the inactive state can be activated by an operation of the user or a control operation of the controller unit 180. That is, the camera module 121 transitions to a state for photographing images (e.g., pictures) or moving images (e.g., video). When the camera module 121 is activated to begin photographing an image, the display module 151 may display the image captured by the camera module 121. Furthermore, when the camera module 121 captures the image, an object image "IM" may be extracted (S12).

Figure 8A:
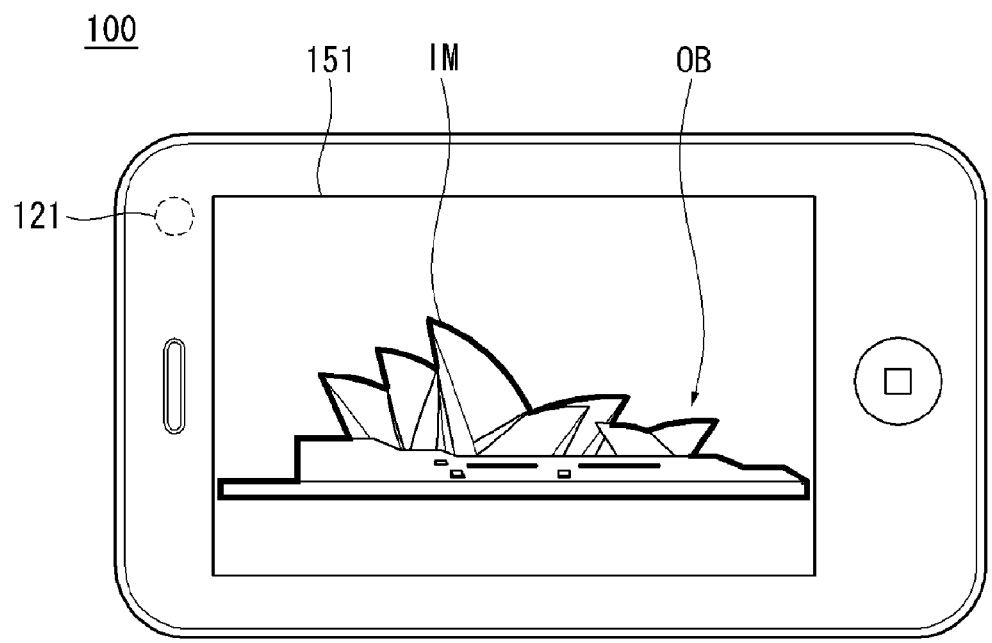
FIGS. 8A and 8B are views for explaining the operation of the mobile terminal according to an embodiment of the present invention.
Figure 8B:
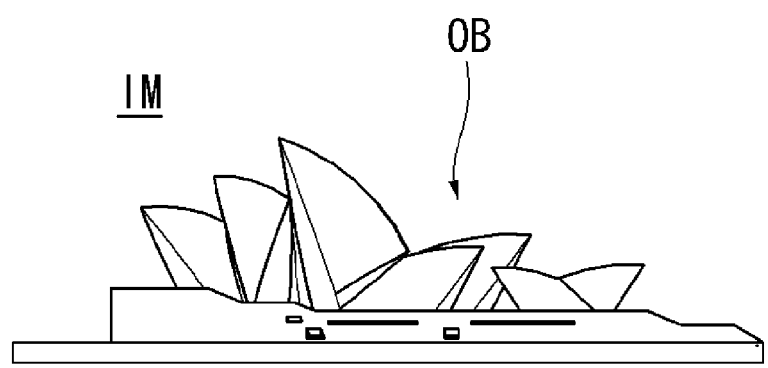

FIGS. 8A and 8B are views for explaining the operation of the mobile terminal according to an embodiment of the present invention. Referring to FIG. 8A, when the camera module 121 captures the image, an object image "IM" may be extracted from the captured image (S12 of FIG. 7).

The object image "IM" is an image of the object "OB" having information in which the user is interested among the various objects included in the captured image. The image captured by the camera module 121 and displayed on the display module 151 may include various objects in addition to the object "OB" in which the user is interested. When the specific object "OB" is selected from the image displayed on the display module 151 according to an operation of the user or a control operation of the controller unit 180, the selected object "OB" may be handled differently from the other objects. For example, the user can touch the outline of the object "OB" in the form of a looped curve or touch within the boundary of the object "OB" to select the specific object "OB."

Referring to FIG. 8B, upon the selection of the object "OB," the controller unit 180 may go to the operation S20 (FIG. 5) of acquiring the geographic information about the object "OB," or transmit the object image IM to the server. The server, for example, can analyze the object image "IM" using resources more abundant than the mobile terminal 100.

Figure 9:
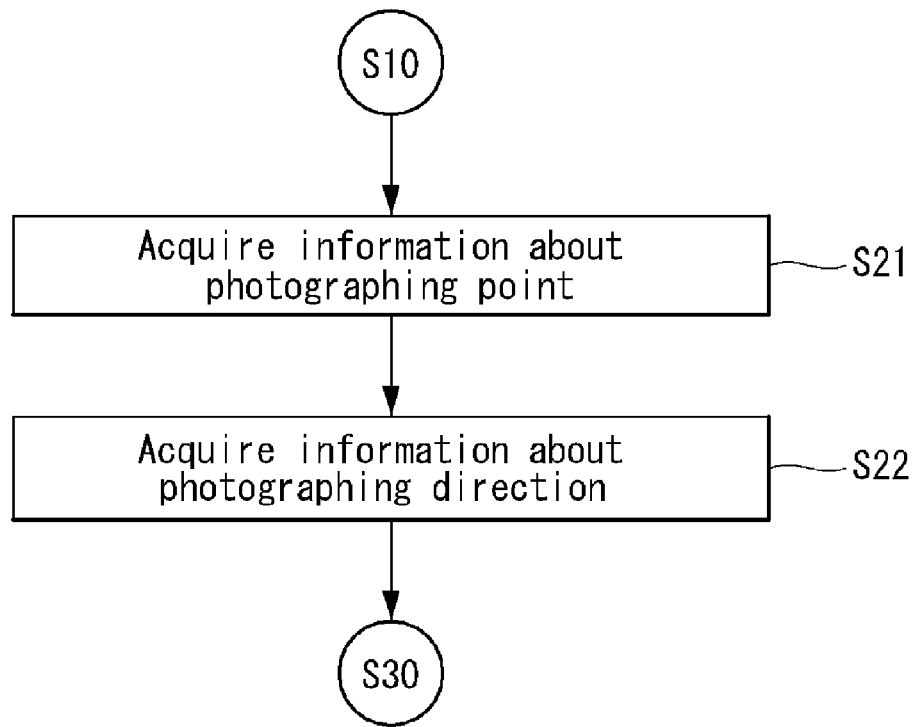
FIG. 9 is a flowchart illustrating an operation of acquiring geographic information according to an embodiment of the present invention.

FIG. 9 is a flowchart illustrating an operation of acquiring geographic information according to an embodiment of the present invention. Referring to FIG. 9, the operation S20 (FIG. 5) of acquiring the geographic information may include acquiring information about a photographing point "TP" (S21). Additionally, the operation S20 may further include acquiring information about a photographing direction "TD" (S22).

Figure 10:
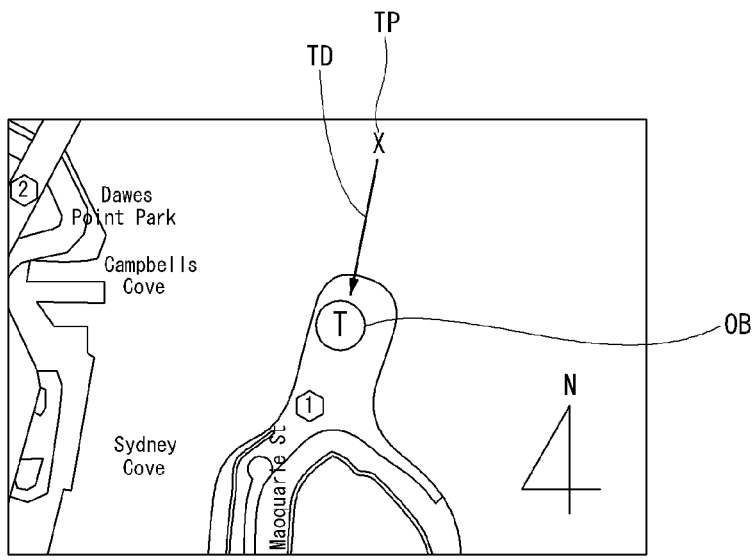
FIG. 10 is a visual representation of acquired geographic information for operating the mobile terminal according to an embodiment of the present invention.

FIG. 10 is a visual representation of acquired geographic information for operating the mobile terminal 100 according to an embodiment of the present invention. The geographic information about a photographing point "TP" and a photographing direction "TG" may be included in basic data used to determine the object "OB" in which the user is interested. That is, the information about the photographing point "TP" and the photographing direction "TG" can be used with the object image "IM" (FIG. 8).

The photographing point "TP" and the photographing direction "TG" may be important basic data used to recognize the area photographed by the camera module 121. That is, the object of the camera module 121 can be changed if any one of the photographing point "TP" and the photographing direction "TG" varies. Accordingly, the controller unit 180 can analyze the photographing point "TP" and the photographing direction "TG" with respect to the object image "IM," or transmit the photographing point "TP" and the photographing direction "TG" with the object image "IM" to the server. The geographic information about the photographing point "TP" may be acquired through GNSS and the geographic information about the photographing direction "TG" may be obtained through a geomagnetic sensor.

Figure 11:
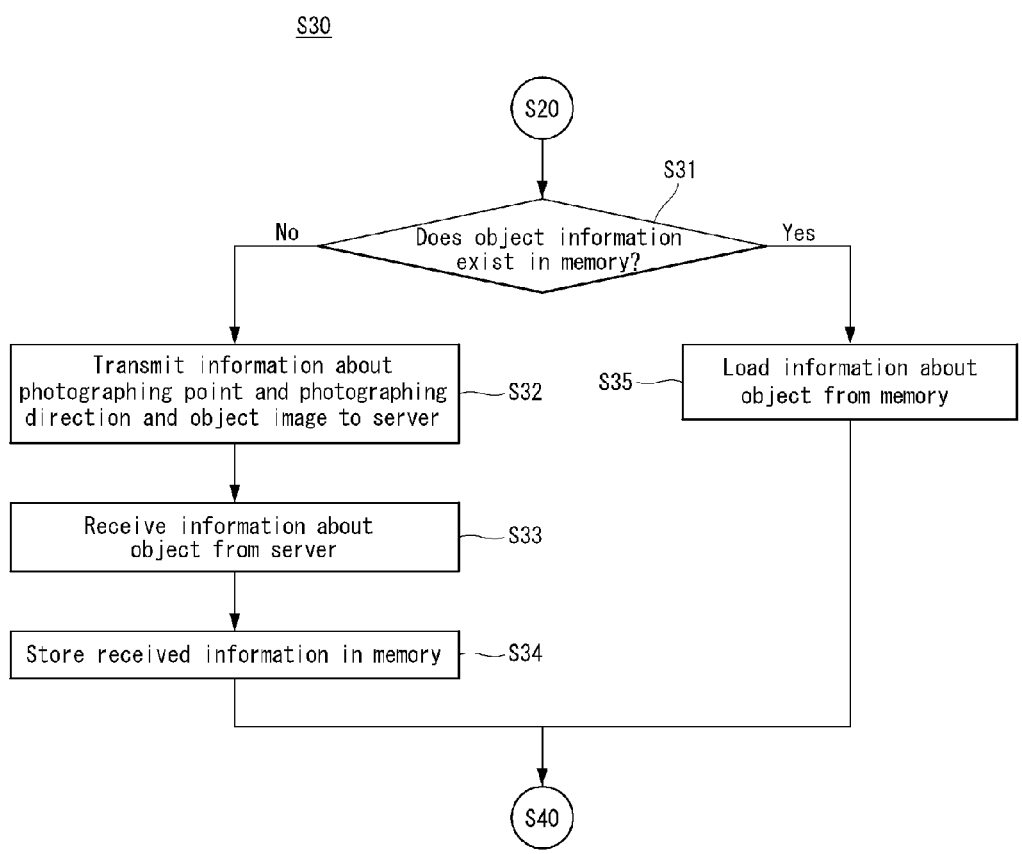
FIG. 11 is a flowchart illustrating an operation of acquiring information about an object included in a captured image according to an embodiment of the present invention.

FIG. 11 is a flowchart illustrating the operation S30 of acquiring information about an object included in a captured image according to an embodiment of the present invention. Referring to FIG. 11, the operation S30 of acquiring the information about the object "OB" included in the surrounding video SV (FIG. 5) may include determining whether the information about the object "OB" exists in memory (S31). In one embodiment, the information about the object "OB" may be stored in the memory unit 160 of the mobile terminal 100. For example, the user can retrieve information about the object "OB" from the memory unit 160 or from a database related to the mobile terminal 100.

If the object information exists in memory, then the controller unit 180 may load the information about the object "OB" from the memory unit 160 (S35).

If the information about the object "OB" does not exist in the memory unit 160, the controller unit 180 may transmit the geographic information about the photographing point ("TP" shown in FIG. 10), the geographic information about the photographing direction ("TD" shown in FIG. 10) and the object image ("IM" shown in FIG. 8) to a server 1000 (S32), receive information about the object "OB" from the server 1000 (S33), and store the received information in the memory unit 160 (S34).

The photographing point "TP," the photographing direction "TD" and the object image "IM" may be basic data used to recognize the object "OB." The controller unit 180 may transmit the whole or part of the information about the photographing point "TP," the information about the photographing direction "TD" and the object image "IM" to the server 1000. For example, the object "OB" can be recognized only using the object image "IM" through an image analysis method.

Furthermore, the object "OB" can be recognized more correctly by using the information about the photographing point "TP" and the photographing direction "TD." The controller unit 180 can transmit the whole or part of the information about the photographing point "TP," the information about the photographing direction "TD" and the object image "IM" to the server 1000 such that the server 1000 can analyze the photographing point "TP," the photographing direction "TD" and the object image "IM."

Figure 12:
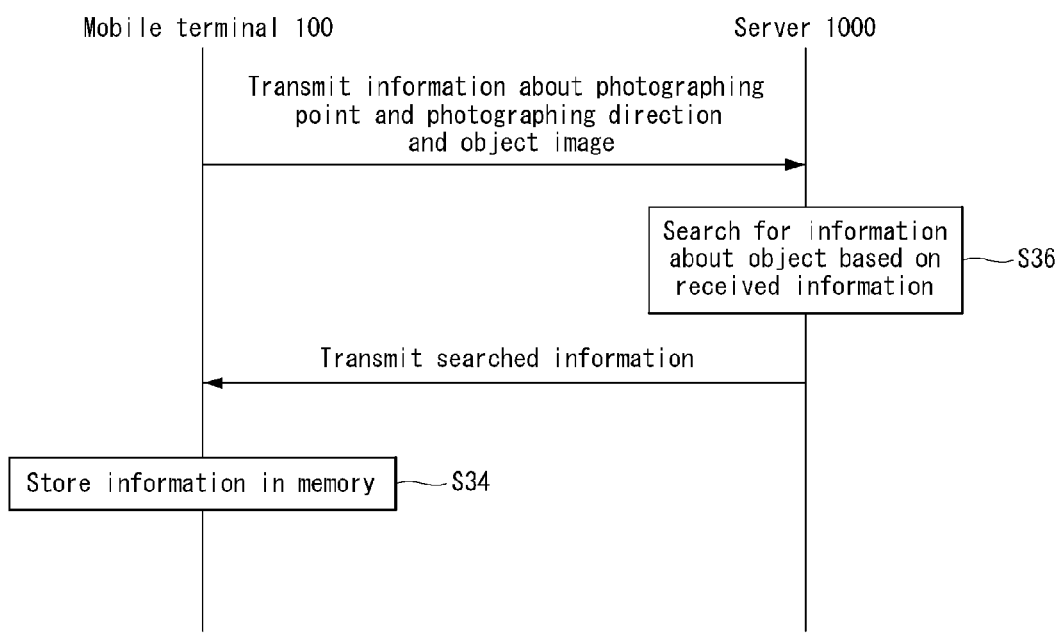
FIG. 12 is a flowchart illustrating the operation of the mobile terminal according to an embodiment of the present invention.

FIG. 12 is a flowchart illustrating the operation of the mobile terminal according to an embodiment of the present invention. Referring to FIG. 12, the server 1000 receives the information from the mobile terminal 100 and searches for the information about the object "OB" based on the received information (S36). The server 1000 may contain more resources than the mobile terminal 100 to be suitable for acquiring information and processing the acquired information.

The controller unit 180 of the mobile terminal 100 may receive the searched information about the object "OB" from the server 1000 (S33 of FIG. 11) and store the received information in the memory unit 160 (S34 of FIG. 11). If the information is stored in the memory unit 160, there is no need to repeatedly receive the information about the object "OB."

Figure 13:
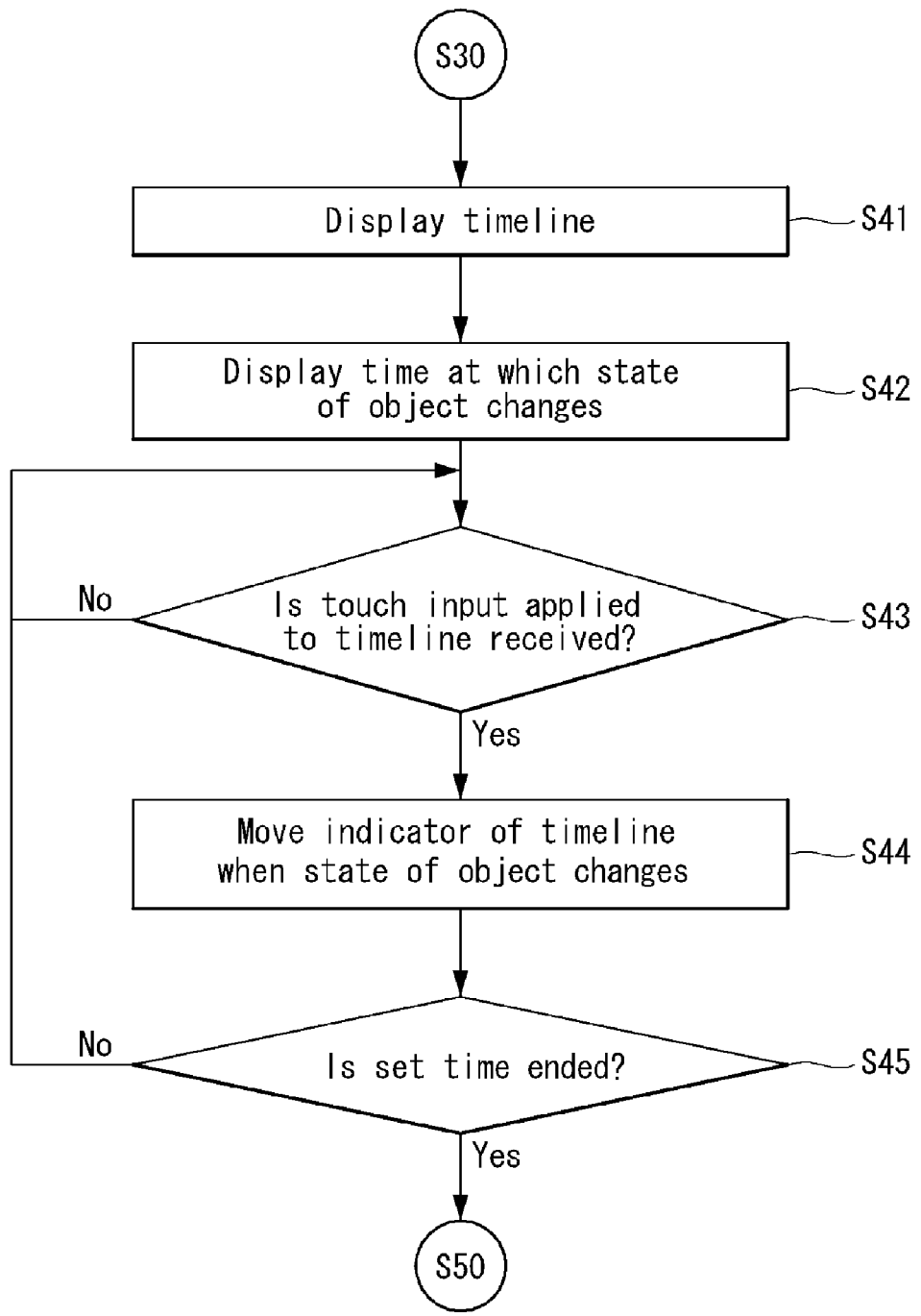
FIG. 13 is a flowchart illustrating an operation of setting a specific time according to an embodiment of the present invention.

FIG. 13 is a flowchart illustrating an operation of setting a specific time according to an embodiment of the present invention. Referring to FIG. 13, the operation S40 of setting the specific time may include displaying a timeline "TL" (S41). The timeline "TL" may function as an interface through which the user can input a specific time. That is, the user can touch the timeline "TL" in a first direction or in a second direction to select information corresponding to a time on the timeline "TL" to be displayed on the display module 151. For example, the user can flick the timeline "TL" to the left. In this case, information to be displayed on the display module 151 may be information corresponding to a specific time in the future.

The timeline "TL" may indicate a time at which the state of the object "OB" changes (S42). For example, if a present time is 1 p.m., it rained until 9 a.m., the weather is clear from 9 a.m. up to the present time, and it will rain at 9 p.m., the weather corresponding to the object "OB" should indicate changes at 9 a.m. and 9 p.m. In the case of weather information, the weather at a specific time and a time at which the weather changes may be important information that draws the user's attention. Accordingly, if the timeline "TL" indicates the time at which the state of the object "OB" changes, the user can conveniently find out the time.

Subsequently, the controller unit 180 may receive a touch input applied to the timeline "TL" (S43). The touch input applied to the timeline "TL" may be dragging or flicking the timeline "TL" to the left or to the right. Upon the acquisition of the touch input applied to the timeline "TL," the controller unit 180 may move an indicator of the timeline "TL" when the state of the object "OB" changes (S44).

The timeline "TL" may be displayed proportionately with the display module 151. For example, the timeline "TL" may be displayed in a relatively small size due to a small area of the display module 151 of the mobile terminal 100. In this case, the user may have a difficulty in correctly operating the timeline "TL" when touching the timeline TL. Accordingly, the controller unit 180 can move the indicator of the timeline "TL" when the state of the object "OB" changes to improve the convenience of use. For instance, if the weather changes at 9 a.m. and 9 p.m., as described above, the indicator is moved from the present time of 1 p.m. to 9 a.m. when the user flicks the timeline "TL" to the left (i.e., to a future time). Alternatively, the indicator can be moved from the present time 1 p.m. to 9 p.m. when the user flicks the timeline "TL" to the right (i.e., to a past time). The operation is performed based on the time at which the state of the object "OB" in which the user is interested changes, and thus an erroneous operation can be prevented.

The controller unit 180 may determine whether or not the time setting operation ended (S45) and perform the next operation when the time setting operation ended.

Figure 14:
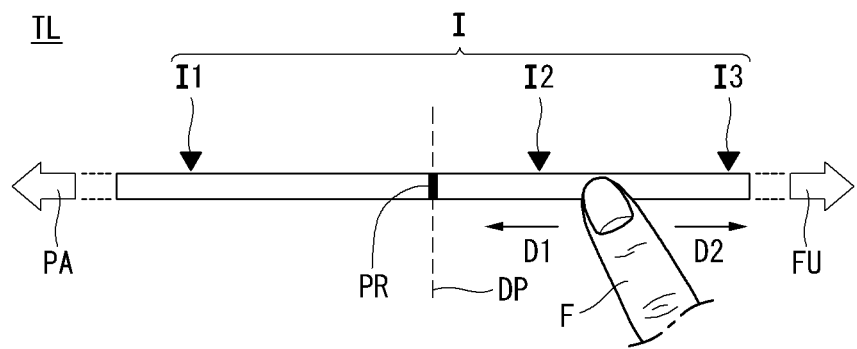
FIGS. 14 through 19 are timelines displayed via a display module of the mobile terminal according to an embodiment of the present invention.

FIGS. 14 through 19 are timelines displayed via the display module 151 of the mobile terminal 100 according to an embodiment of the present invention. Referring to FIG. 14, the timeline "TL" may include a first indicator "PR" indicating a present time. In addition, the timeline "TL" may include a second indicator "DP" indicating a reference of the image being displayed on the display module 151. Since the first indicator "PR" is located at the second indicator "DP," the image currently captured by the camera module 121 is being displayed on the display module 151.

Moreover, first "I1," second "I2" and third icon "I3" may indicate moments of time at which the state of the object "OB" changes. Since the first icon "I1" is located to the left of the first indicator "PR" and the second icon "I2" and third icon "I3" are placed to the right of the first indicator "PR," the user can be notified that the state of the object "OB" changed at a specific time in the past (i.e., indicated by the first icon "I1") and the state of the object "OB" will change at specific moments of time in the future (i.e., indicated by the second icon "I2" and third icon "I3").

Furthermore, first arrow "PA" indicating a past time and second arrow "FU" indicating a future time allow the user to intuitively know whether there is an event of changing the state of the object "OB" in the past or in the future. The first arrow "PA" and second arrow "FU" are displayed according to a change in the state of the object "OB" in the past time and the future time.

Finally, the user may touch the timeline "TL" in a first direction "D1" or a second direction "D2" with a finger "F." Touching the timeline "TL" in the first direction "D1" means moving to a specific time in the past and touching the timeline "TL" in the second direction "D2" means moving to a specific time in the future. That is, the user can drag or flick the timeline "TL" in the first direction "D1" when the user wants to move to the past time from the present time. Alternative, the user may drag or flick the timeline "TL" in the second direction D2 when the user wants to move to the future time from the present time.

Figure 15:
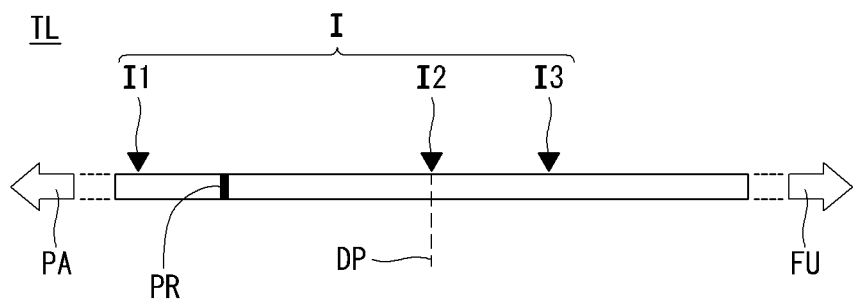

Referring to FIG. 15, when the user touches the timeline "TL" in the first direction ("D1" shown in FIG. 14), the display of the timeline "TL" is moved to the left. That is, the first indicator "PR" indicating the present time is moved to the left of the second indicator "DP" indicating the reference of the image displayed on the display module 151. The display of the timeline "TL" can vary according to when the state of the object "OB" changes. The second icon "I2" can be located by the second indicator "DP," and thus the state of the object "OB" at a specific time (i.e., indicated by the second icon "I2") can be displayed on the display module 151.

Figure 16:
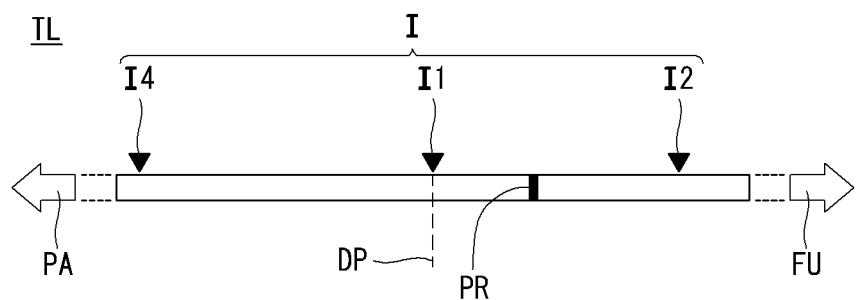

Referring to FIG. 16, when the user touches the timeline "TL" in the second direction ("D2" shown in FIG. 14), the first indicator "PR" is moved to the right of the second indicator "DP." Furthermore, the first icon "I1" representing a specific time at which the state of the object "OB" changed in the past can be located by the second indicator "DP" since the first indicator "PR" moves according to when a specific event of changing the state of the object "OB" is generated. In addition, the timeline "TL" further includes a fourth icon "I4" indicating that an event of changing the state of the object "OB" was generated at a time prior to the specific time corresponding to the first icon "I1" in the past.

Figure 17:
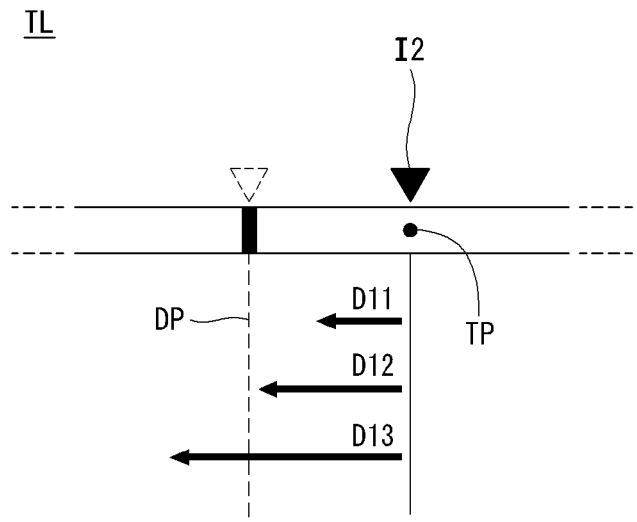

FIG. 17 shows a relationship between the length of a user's touch and a moving distance of the timeline "TL." Referring to FIG. 17, the user may touch the timeline "TL" from a point "TP" in a leftward direction with different touch lengths. That is, the user may touch the timeline "TL" from the point "TP" to the left in a first touch length "D11" that does not reach the second indicator "DP" indicating the reference of the image displayed on the display module 151, a second touch length "D12" reaching the second indicator "DP" and a third touch length "D13" that passes the second indicator "DP."

Here, the second icon "I2" is moved to the second indicator "DP" for all the three cases although the user's touches have different lengths. That is, the timeline "TL" according to an embodiment of the present invention can move the indicators when the state of the object "OB" changes, and thus information corresponding to a next event can be displayed on the display module 151 if there is a user's touch toward a specific direction. The event means a change in the state of the object "OB." When there is a user's touch toward a specific direction, the information corresponding to the next event can be displayed on the display module 151 irrespective of the length of the user's touch so that the user can conveniently operate the mobile terminal 100.

Figure 18:
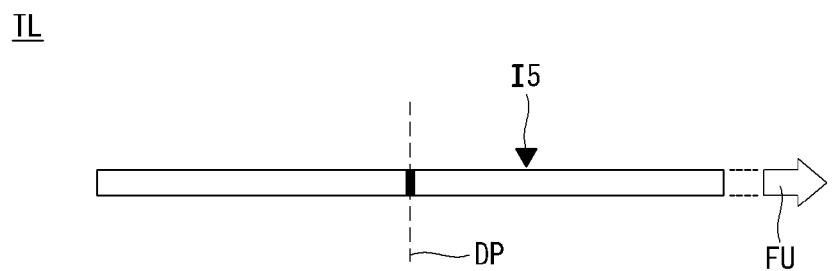
Figure 19:
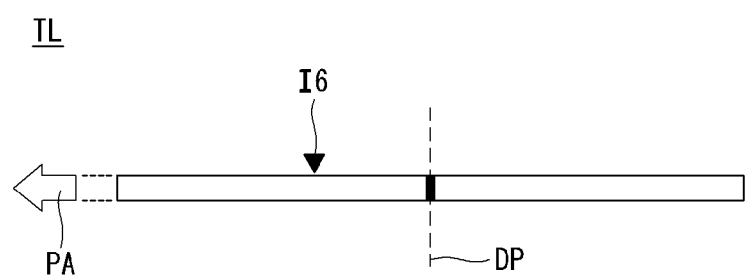

FIGS. 18 and 19 illustrate a first arrow "PA" and a second arrow "FU" being displayed according to whether an event is generated indicating a change of state of the object "OB." Referring to FIG. 18, a fifth icon "I5" is located on a point corresponding to a future time of the timeline "TL" based on the second indicator "DP." That is, the fifth icon "I5" shows that there is an event of changing the state of the object "OB" at a specific time in the future. To clearly inform the user of the event, the timeline "TL" may display the second arrow "FU." The user can intuitively know there is information about a specific time in the future from the second arrow "FU." Meantime, information about an event generated in a past time based on the second indicator "DP" may not exist. In this case, the first arrow "PA" is not displayed.

Referring to FIG. 19, a sixth icon "I6" representing that an event is generated at a specific time in the past may be displayed on the timeline "TL," and thus the first arrow "PA" can be displayed. Furthermore, when there is no information about a future event, the second arrow "FU" is not displayed.

Figure 20:
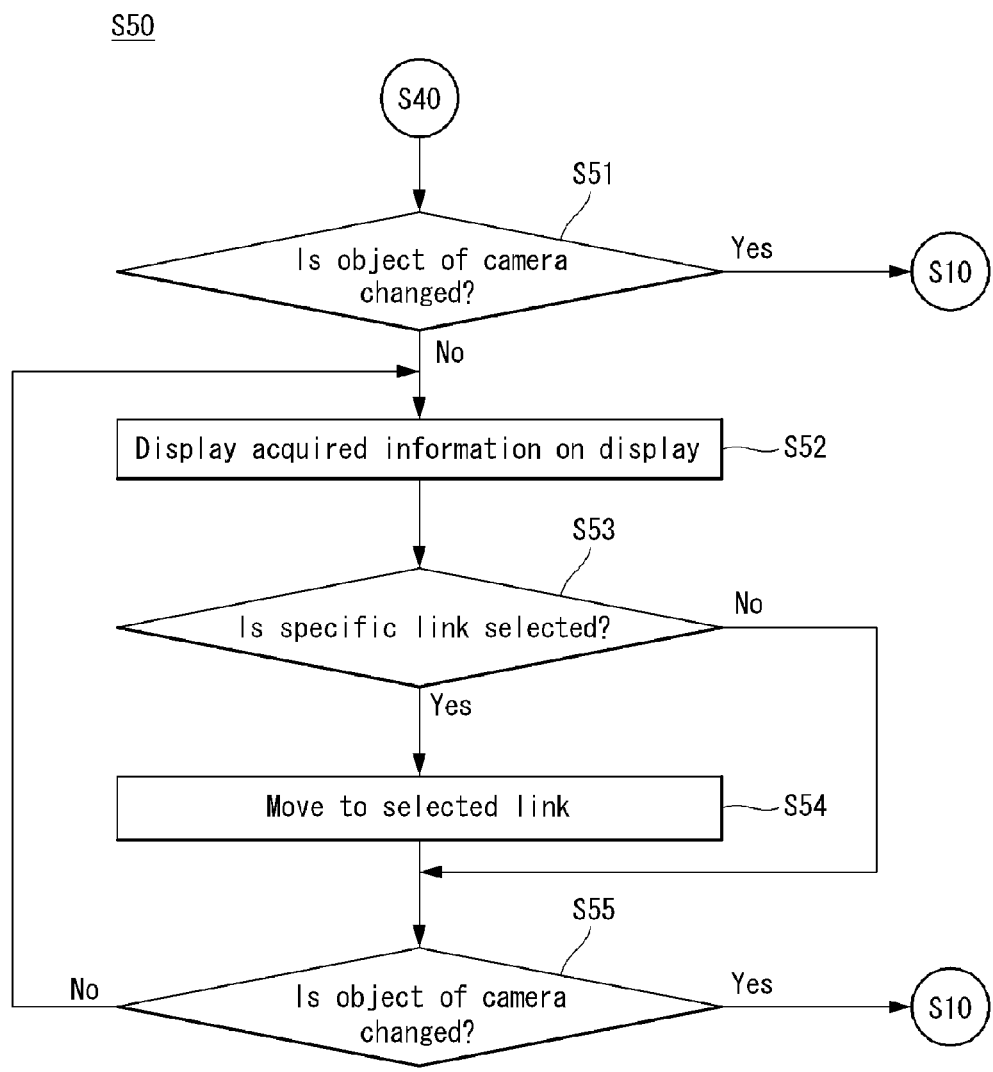
FIG. 20 is a flowchart illustrating an operation of displaying object information at a set time according to an embodiment of the present invention.

FIG. 20 is a flowchart illustrating an operation of displaying object information at a set time according to an embodiment of the present invention. Referring to FIG. 20, the operation S50 (FIG. 5) of displaying the object information of the set time may include determining whether the object captured by the camera module 121 has changed (S51). If the object "OB" captured by the camera module 121 has not changed, the controller unit 180 may display the acquired information on the display module 151 (S52). When the acquired information is displayed on the display module 151, the controller unit 180 may determine whether the user selects a specific link (S53). Thereafter, the user may move to the selected link (S54). Otherwise, the controller unit 180 determines again whether the object has changed when the specific link was not selected (S55).

Figure 21:
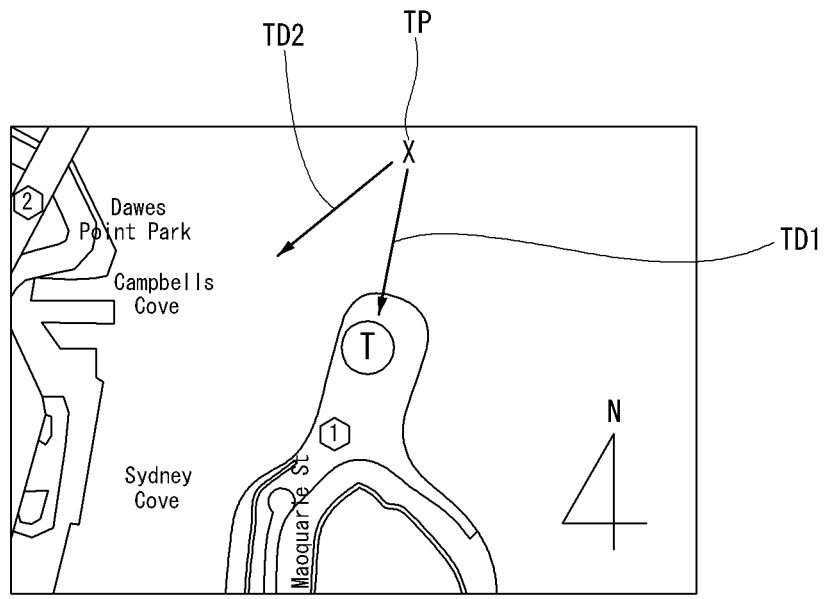
FIGS. 21 through 23 illustrate operation of displaying object information at a set time via the display module of the mobile terminal according to an embodiment of the present invention.
Figure 22:
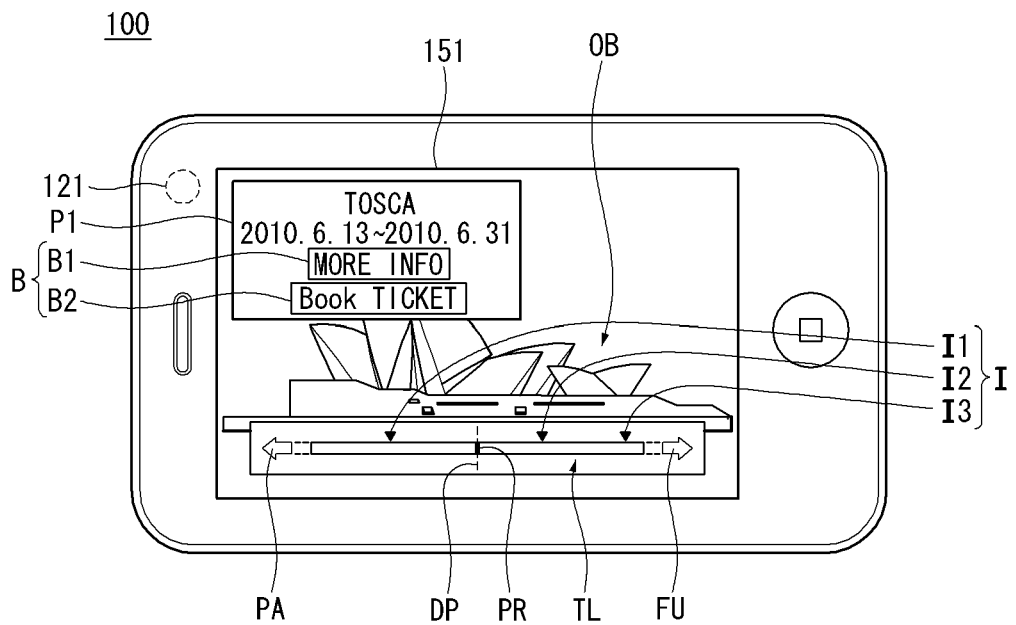
Figure 23:
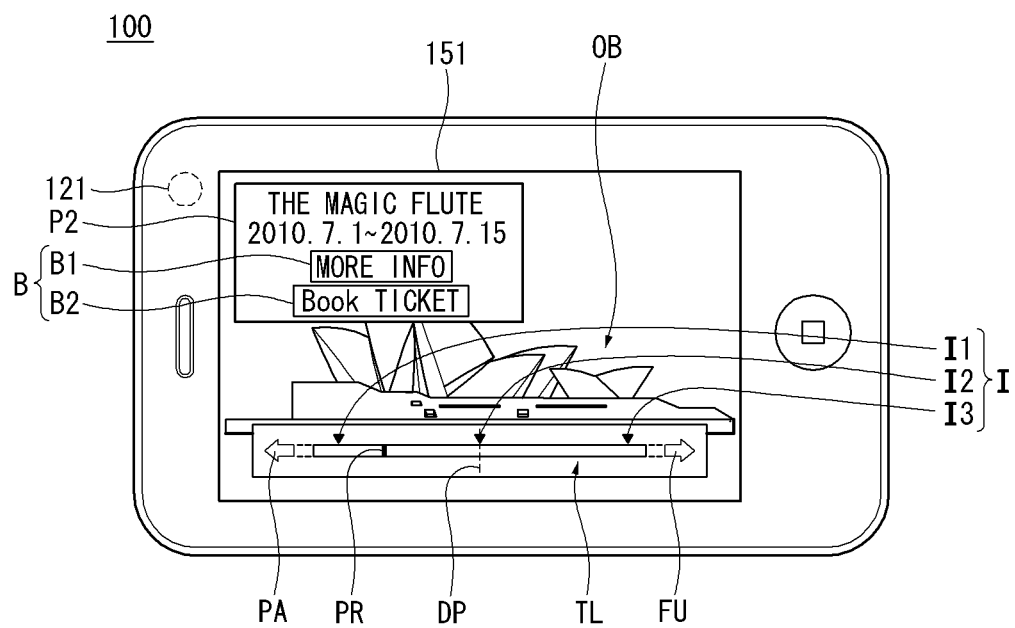

FIGS. 21 through 23 are conceptual views illustrating operation of displaying object information at a set time via the display module 151 of the mobile terminal 100 according to an embodiment of the present invention. A user can vary the position and orientation of the mobile terminal 100 to change the object "OB" captured by the camera module 121 frequently. A method of displaying information relating to an image captured by the user and displayed may be referred to as augmented reality (AR). The controller unit 180 may display the information relating to the object "OB" using the "AR." Accordingly, if the object "OB" of the camera module 121 is changed, the operations of capturing an image of the changed object and acquiring information about the changed object can be repeated.

Referring to FIG. 21, if the photographing direction is changed from a first orientation "TD1" to a second orientation "TD2" even though the photographing point "TP" is not changed, the camera module 121 can photograph a different object. The change of the photographing direction from the first orientation "TD1" to the second orientation "TD2" may be sensed by a geomagnetic sensor, for example.

If the object "OB" of the camera module 121 is not changed, the controller unit 180 may display the acquired information on the display module 151 (S52 of FIG. 20). The information about the object "OB" can be acquired through the aforementioned operation S30 shown in FIG. 5.

Referring to FIG. 22, the acquired information may be displayed through a first pop-up window "P1." When the object "OB" is a theater, information about the theater is displayed through the first pop-up window "P1." For example, a title or a period relating to a programming schedule of the theater can be displayed. Furthermore, buttons "B" connected to related functions may be displayed on the first pop-up window "P1." For example, a first button "B1" connected to a link for obtaining detailed information and a second button "B2" connected to a link for buying a ticket can be displayed on the first pop-up window "P1."

The information about the object "OB," displayed via the display module 151, may be changed in response to a user's touch input. That is, past or future information about the object "OB" can be displayed in response to a touch of the timeline "TL." For example, the user touches the timeline "TL" and the controller unit 180 displays information of the object "OB" with respect to a time period corresponding to the touch.

Referring FIG. 23, when the second icon "I2" is located on the second indicator "DP" in response to a user's touch, information with respect to a time period corresponding to the user's touch is displayed through a second pop-up window "P2."

When the information is displayed on the display module 151, the controller unit 180 may determine whether the user selects a specific link (S53 of FIG. 20) and move to the selected link (S54 of FIG. 20). The specific link may be represented by the first and second buttons "B1" and "B2." When the user selects one of the first and second buttons, the user can move to a web page including information corresponding to the selected button.

Subsequently, the controller unit 180 may determine whether the object of the camera module 121 changed again (S55 of FIG. 20). If the object captured by the camera module 121 has not changed, the information displayed on the display module 151 can be maintained. If the object changed, the operation of acquiring new information can be repeated.

FIGS. 24A through 27B are views for explaining an operation of the mobile terminal according to an embodiment of the present invention. The controller unit 180 can provide various information items in various manners.

Figure 24A:
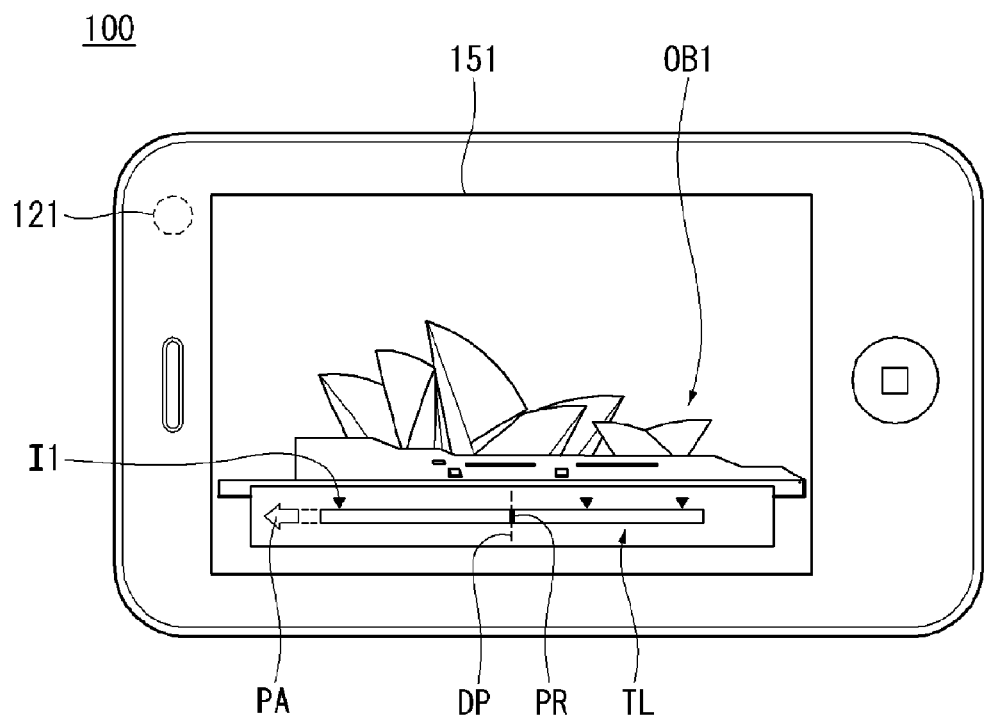
FIGS. 24A through 27B are views for explaining an operation of the mobile terminal according to an embodiment of the present invention.

Referring to FIG. 24A, the controller unit 180 may control the display module 151 to display a present appearance "OB1" of the object. Specifically, the display module 151 may display the image currently captured by the camera module 121. The image currently photographed can be displayed via the display module 151, and thus the first indicator "PR" is superimposed with the second indicator "DP" on the timeline "TL."

Moreover, a first icon "I1" can be displayed at a specific time in the past on the timeline "TL." That is, the object corresponding to the specific time in the past has a different state from the current state "OB1."

Figure 24B:
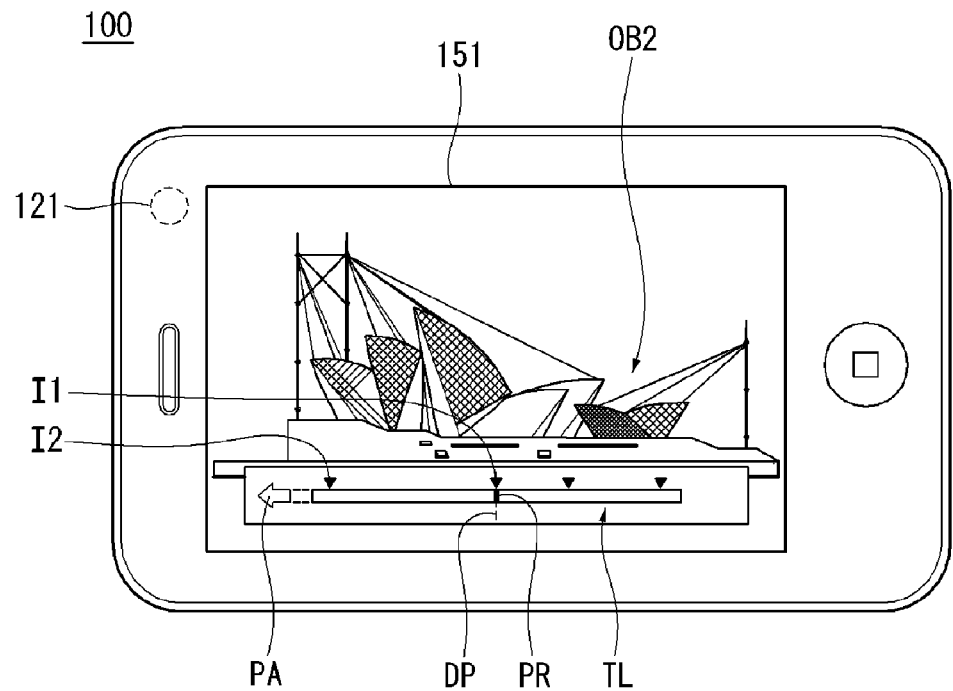

Referring to FIG. 24B, the user may touch the timeline "TL" to locate the first icon "I1" indicating the specific time in the past on the second indicator "DP." Then, the past object "OB2" corresponding to the first icon "I1" may be displayed on the display module 151. The event corresponding to the first icon "I1" represents the past object "OB2" under construction.

In addition, a second icon "I2" indicating a time prior to the time indicated by the first icon "I1," may be displayed on the display module 151. That is, there may be information about a building existing before the past object "OB2." The existence of the information about the past object can be known through manipulation of the first arrow "PA."

Figure 25A:
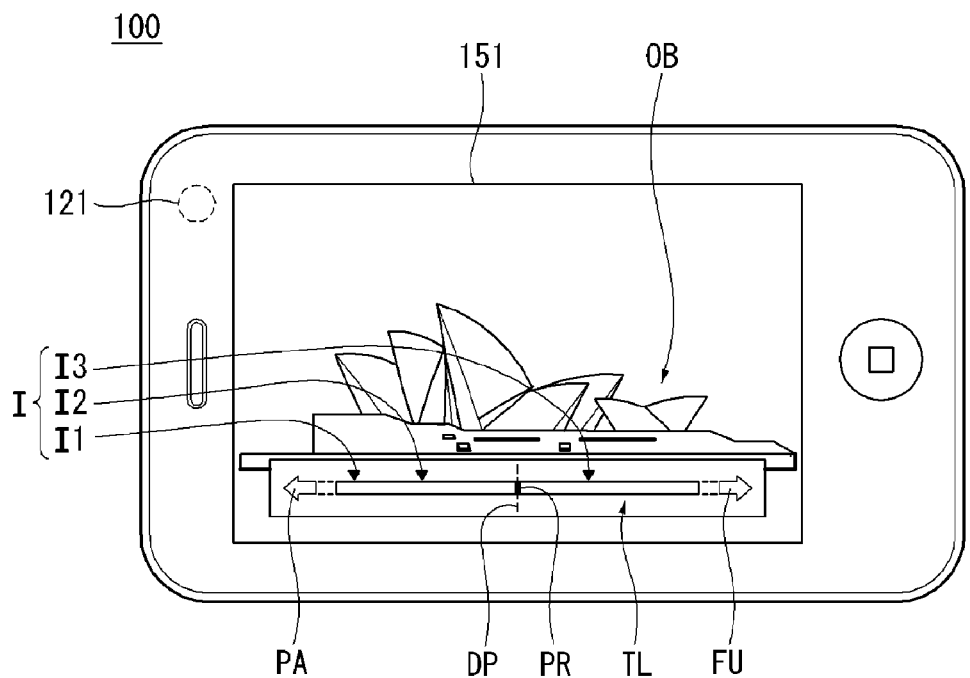
Figure 25B:
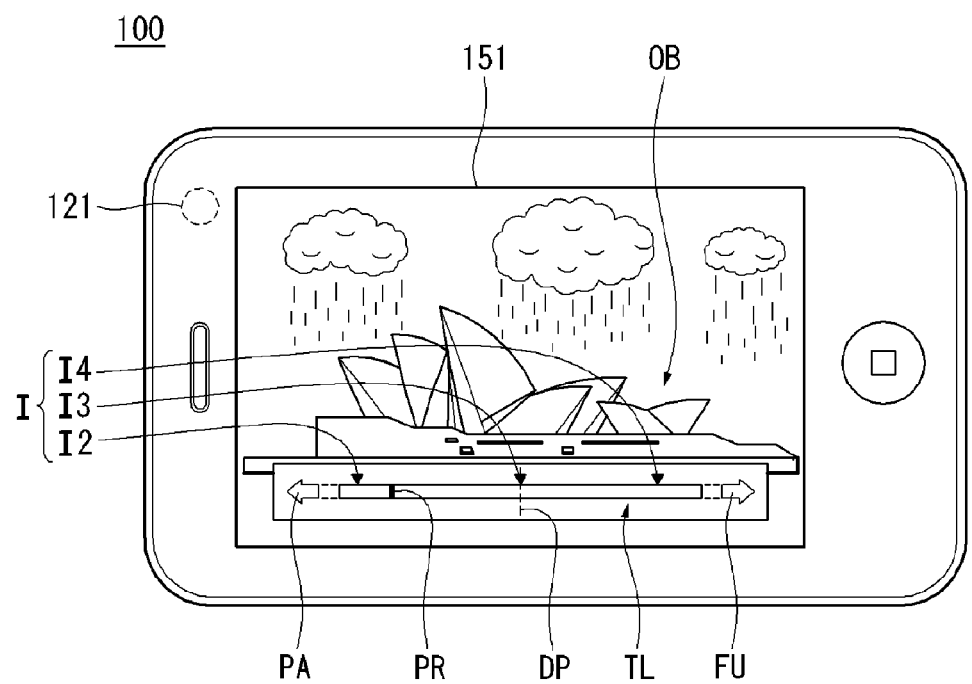

Referring to FIGS. 25A and 25B, the controller unit 180 may display weather information on the display module 151. Referring to FIG. 25A, the first, second and third icons (e.g., "I1," "I2" and "I3") may be displayed on the timeline "TL." The icons "I1," "I2" and "I3" may represent weather information, particularly, moments of time at which the weather condition changes. In a first example, the weather before a time indicated by the first icon "I1" may be different from the weather during a period of time indicated by the first and second icons (e.g., "I1", "I2"). In a second example, the weather before the time indicated by the second icon "I2" may be different from the weather during a period of time indicated by the second and third icons (e.g., "I2" and "I3"). In a third example, the weather during the period indicated by the second and third icons may be different from the weather existing after the time indicated by the third icon "I3." Past weather information represents actual weather, and future weather information represents forecasted weather.

Referring to FIG. 25B, the user may touch the timeline "TL" to confirm the weather of a specific time in the future. That is, the user can touch the timeline "TL" to locate the third icon "I3" on the second indicator "DP." Then, weather information corresponding to the third icon "I3" is displayed on the display module 151. If the weather information corresponding to the third icon "I3" is "rain," an image expressing the "rain" may overlap the image captured by the camera module 121 and displayed on the display module 151. Furthermore, a pop-up window (not shown) may be displayed on the display module 151 to transmit detailed weather information in text.

Figure 26A:
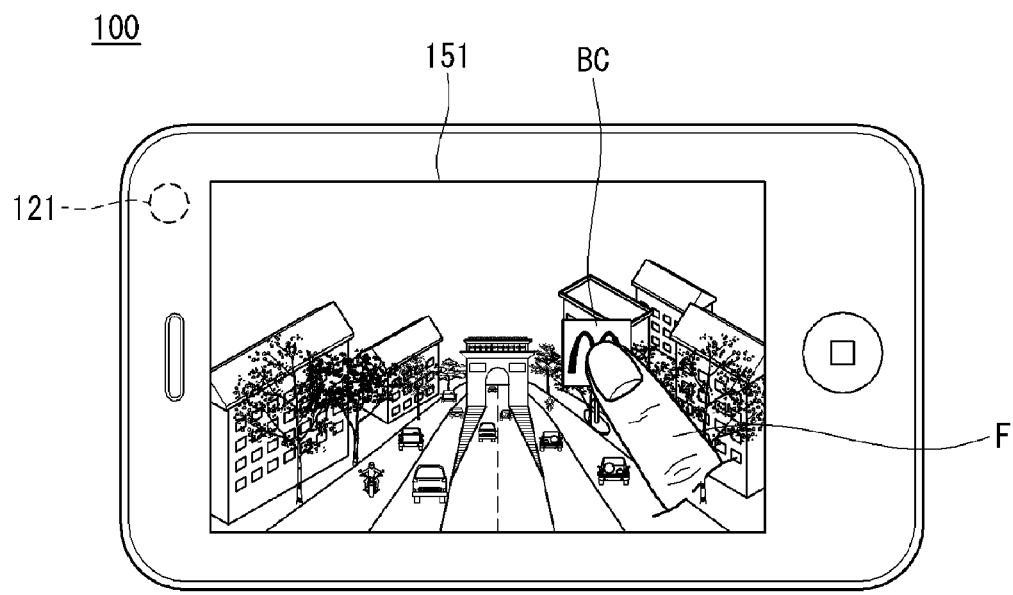
Figure 26B:
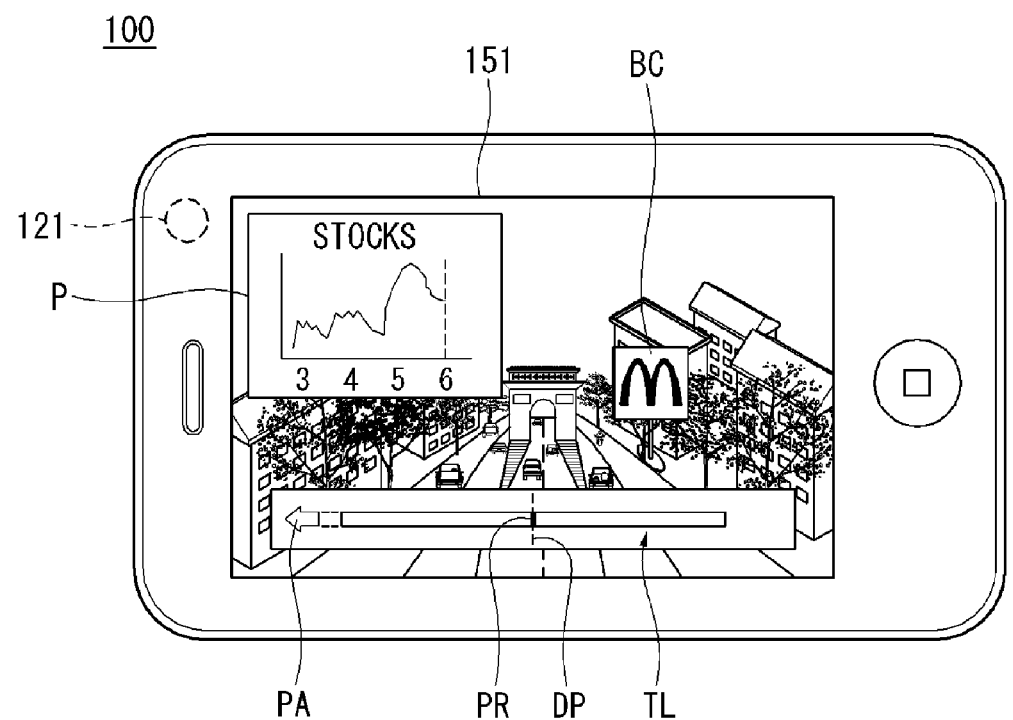

Referring to FIGS. 26A and 26B, the controller unit 180 may display stock information of a specific publicly traded company on the display module 151. Referring to FIG. 26A, an image of a street may be captured by the camera module 121 and displayed on the display module 151. The displayed image may include an advertisement "BC" corresponding to a specific company. The user may touch the advertisement "BC."

Referring to FIG. 26B, the controller unit 180 may analyze the image of the advertisement "BC" in response to the touch signal. Furthermore, the controller unit 180 may transmit the image of the advertisement "BC" to a server such that the server analyzes the image of the advertisement. When the controller unit 180 confirms the advertisement of the specific company from the analysis, the controller unit 180 may request for the stock information of the company and acquire the stock information. The controller unit 180 may display the acquired stock information through a pop-up window "P." Furthermore, the controller unit 180 may operate the timeline "TL" to display stock information corresponding to a specific time in the present or past.

Figure 27A:
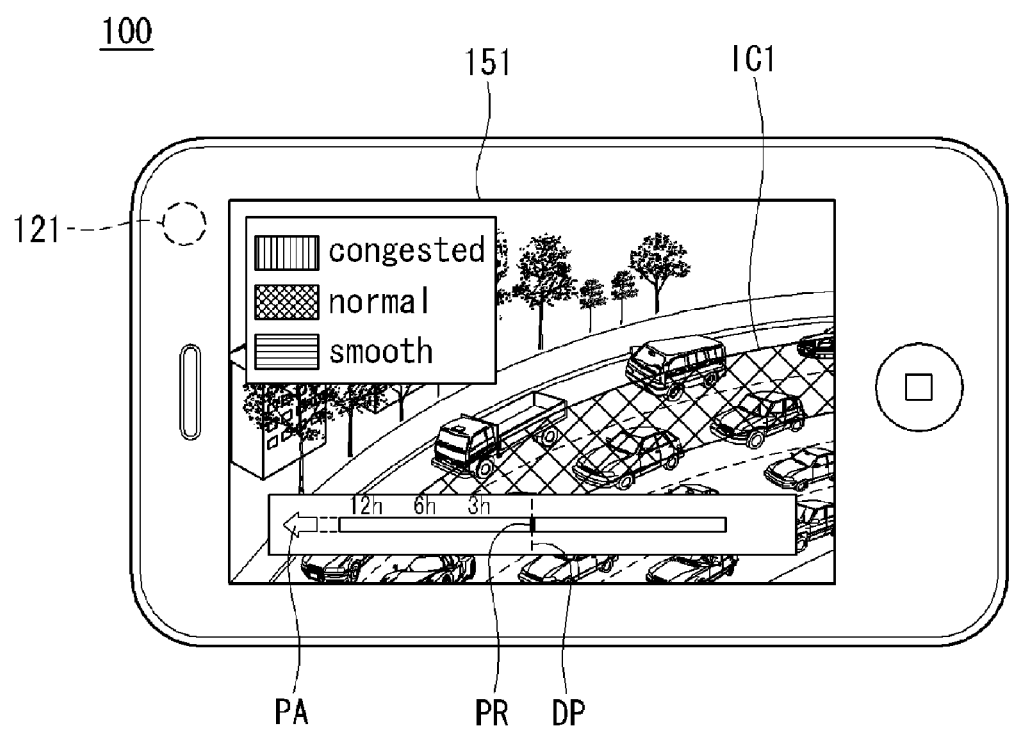
Figure 27B:
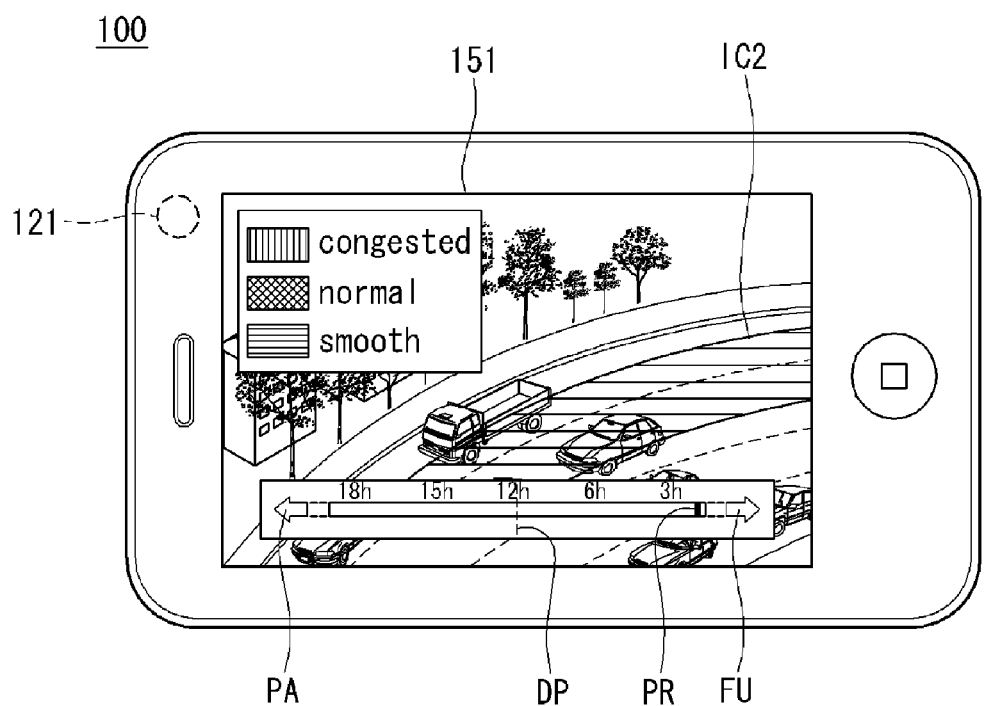

Referring to FIGS. 27A and 27B, the controller unit 180 can display traffic information on the display module 151. Referring to FIG. 27A, a road may be photographed through the camera module 121 and an image of the road may be displayed on the display module 151. The controller unit 180 may provide traffic information of the road with the image of the road. That is, the controller unit 180 may provide information about the road such as whether the road is 'congested', 'normal' or 'smooth' using different signs or colors such that the user can intuitively recognize traffic on the road. The first indicator "PR" can be located on the second indicator "DP" on the timeline "TL." In other words, the current traffic can be displayed using the first indicator "PR."

Referring to FIG. 27B, the user may touch the timeline "TL" to check the traffic of the same road at a specific time in the past. Here, the second indicator "DP" indicates the time as "12 hours" prior to the first indicator "PR." Accordingly, the display module 151 can display traffic information directed to specific time of "12 hours" prior.

The above-described method of controlling the mobile terminal may be written as computer programs and may be implemented in digital microprocessors that execute the programs using a computer-readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The computer-readable recording medium may also be distributed over a network coupled computer systems so that the computer-readable code is stored and executed in a distributed fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of this document. The appearances of such phrases in various places in the specification are not necessarily all referring to the same embodiment. Further, when a particular feature, structure, or characteristic is described in connection with any embodiment, it is submitted that it is within the purview of one skilled in the art to reasonably understand such feature, structure, or characteristic in connection with other embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling information in a mobile terminal, the method comprising:
   displaying an image on a display of the mobile terminal, the image including a real-world object, a timeline, and object information related to the real-world object at a particular time point of a plurality of time points of the timeline;
   displaying a plurality of first indicators on the timeline each indicating a corresponding time point at which the object information is changed, wherein the plurality of first indicators are displayed at different positions on the timeline;

displaying a second indicator at a fixed position overlapping the timeline for indicating the particular time point;

receiving a touch input on the timeline in a first direction or a second direction, wherein the touch input is a drag input or a flick input;

moving the plurality of first indicators in the first direction or the second direction according to a direction of the touch input so that a particular indicator of the plurality of first indicators overlaps the second indicator irrespective of a length of the touch input; and displaying changed object information and a changed image including the real-world object according to a change of the particular time point to a time point corresponding to the particular indicator, and wherein the particular indicator corresponds to a future time point on the timeline with respect to the second indicator when the touch input is received in the first direction or the particular indicator corresponds to a past time point on the timeline with respect to the second indicator when the touch input is received in the second direction.

2. The method of claim 1, further comprising obtaining the image via a camera of the mobile terminal, a memory of the mobile terminal, or a wireless communication unit of the mobile terminal.

3. The method of claim 1, further comprising obtaining the object information from a server or a memory of the mobile terminal.

4. The method of claim 1, further comprising:
displaying the changed image simultaneously with the changed object information.

5. The method of claim 1, further comprising:
obtaining geographic information related to the displayed real-world object.

6. The method of claim 5, wherein the obtained geographic information is related to a general location at which the displayed real-world object is photographed.

7. The method of claim 5, wherein the obtained geographic information is related to at least a photographing point or a photographing direction.

8. The method of claim 5, wherein displaying the image comprises:
activating a camera of the mobile terminal; and
extracting the real-world object from the image.

9. The method of claim 8, further comprising:
determining whether the object information is stored in a memory of the mobile terminal;
transmitting the obtained geographic information and information related to the extracted real-world object to a server when the object information is not stored in the memory;
receiving the object information identifying the extracted real-world object from the server; and
storing the received object information in the memory.

10. The method of claim 1, wherein displaying the object information comprises:
displaying a specific link;
determining that the displayed specific link is selected; and
displaying information corresponding to the selected specific link.

11. A method of controlling information in a mobile terminal, the method comprising:

displaying an image on a display of the mobile terminal, the image including a real-world object, a timeline, and object information related to the real-world object at a particular time point of a plurality of time points of the timeline;

displaying a plurality of first indicators on the timeline each indicating a corresponding time point at which a state of the real-world object is changed, wherein the plurality of first indicators are displayed at different positions on the timeline;

displaying a second indicator at a fixed position overlapping the timeline for indicating the particular time point;

receiving a touch input on the timeline in a first direction or a second direction, wherein the touch input is a drag input or a flick input;

moving the plurality of first indicators in the first direction or the second direction according to a direction of the touch input until a particular indicator of the plurality of first indicators overlaps the second indicator irrespective of a length of the touch input; and displaying a changed image including a different version of the displayed real-world object according to a change of the particular time point to a time point corresponding to the particular indicator, wherein the particular indicator corresponds to a future time point on the timeline with respect to the second indicator when the touch input is received in the first direction or the particular indicator corresponds to a past time point on the timeline with respect to the second indicator when the touch input is received in the second direction.

12. A method of controlling information in a mobile terminal, the method comprising:

displaying an image on a display of the mobile terminal, the image including a real-world object, a timeline, and object information related to the real-world object at a particular time point of a plurality of time points of the timeline;

displaying a plurality of first indicators on the timeline each indicating a corresponding time point at which the information related to the real-world object or a state of the real-world object is changed, wherein the plurality of first indicators are displayed at different positions on the timeline;

displaying a second indicator at a fixed position overlapping the timeline for indicating the particular time point;

receiving a touch input on the timeline in a first direction or a second direction, wherein the touch input is a drag input or a flick input;

moving the plurality of first indicators in the first direction or the second direction according to a direction of the touch input such that a particular indicator of the plurality of first indicators overlaps the second indicator irrespective of a length of the touch input; and displaying changed object information according to a change of the particular time point to a time point corresponding to the particular indicator;

wherein the particular indicator corresponds to a future time point on the timeline with respect to the second indicator when the touch input is received in the first direction or the particular first indicator corresponds to a past time point on the timeline with respect to the second indicator when the touch input is received in the second direction.

13. A mobile terminal, comprising:
a display configured to display information and receive touch inputs; and a controller configured to:
cause the display to display an image including a real world object, a timeline, and object information related to the real-world object at a particular time point of a plurality of time points of the timeline;
cause the display to display a plurality of first indicators on the timeline, wherein the plurality of first indicators each indicate a corresponding time point at which the object information is changed, wherein the plurality of first indicators are displayed at different positions on the timeline,
cause the display to display a second indicator at a fixed position overlapping the timeline for indicating the particular time point of the plurality of time points;
receive a touch input on the timeline via the display in a first direction or a second direction, wherein the touch input is a drag input or a flick input,
cause the display to move the plurality of first indicators in the first direction or the second direction according to a direction of the touch input such that a particular indicator of the plurality of first indicators overlaps the second indicator irrespective of a length of the touch input; and
cause the display to display a changed image including the real-world object and changed object information according to a change of the particular time point to a time point corresponding to the particular indicator,
wherein the particular indicator corresponds to a future time point on the timeline with respect to the second indicator when the touch input is received in the first direction or the particular indicator corresponds to a past time point on the timeline with respect to the second indicator when the touch input is received in the second direction.

14. The mobile terminal of claim 13, further comprising a wireless communication unit configured to receive the object information from a server.

15. The mobile terminal of claim 14, further comprising a memory configured to store the received object information.

16. The mobile terminal of claim 13, wherein the timeline comprises at least a past time point, a present time point, or a future time point.

17. The mobile terminal of claim 13, wherein the displayed object information comprises weather information, event information, financial information, or traffic information.

* * * * *